United States Patent
Sakhnini et al.

(10) Patent No.: US 12,069,701 B2
(45) Date of Patent: Aug. 20, 2024

(54) CONFIGURING A TIME DOMAIN CONTROL RESOURCE SET FOR SINGLE CARRIER WAVEFORMS

(71) Applicant: QUALCOMM Incorporated, San Diego, CA (US)

(72) Inventors: Iyab Issam Sakhnini, San Diego, CA (US); Tao Luo, San Diego, CA (US); Jing Sun, San Diego, CA (US); Xiaoxia Zhang, San Diego, CA (US)

( * ) Notice: Subject to any disclaimer, the term of this patent is extended or adjusted under 35 U.S.C. 154(b) by 101 days.

(21) Appl. No.: 17/236,857

(22) Filed: Apr. 21, 2021

(65) Prior Publication Data

US 2022/0346099 A1    Oct. 27, 2022

(51) Int. Cl.

| H04W 72/04 | (2023.01) |
| H04L 5/00 | (2006.01) |
| H04W 24/08 | (2009.01) |
| H04W 72/0446 | (2023.01) |
| H04W 72/23 | (2023.01) |
| H04W 72/53 | (2023.01) |

(52) U.S. Cl.
CPC .......... H04W 72/53 (2023.01); H04L 5/0048 (2013.01); H04W 72/0446 (2013.01); H04W 72/23 (2023.01)

(58) Field of Classification Search
None
See application file for complete search history.

(56) References Cited

U.S. PATENT DOCUMENTS

| 9,510,340 B2* | 11/2016 | Kim ..................... H04W 76/10 |
| 2014/0355559 A1* | 12/2014 | Gao ..................... H04L 5/0005 |
| | | 370/330 |
| 2018/0288749 A1* | 10/2018 | Sun ...................... H04W 72/042 |
| 2018/0375636 A1* | 12/2018 | You ....................... H04L 5/0092 |
| 2019/0103941 A1* | 4/2019 | Seo ....................... H04L 1/0071 |
| 2020/0036558 A1* | 1/2020 | Shen ..................... H04L 5/0007 |
| 2020/0076559 A1* | 3/2020 | Yoshimura ........ H04W 72/0413 |
| 2020/0092866 A1* | 3/2020 | Xue ..................... H04L 5/0053 |
| 2020/0100223 A1* | 3/2020 | Park ..................... H04W 72/23 |
| 2020/0178232 A1* | 6/2020 | Li ......................... H04L 5/0053 |
| 2020/0367242 A1* | 11/2020 | Moon ..................... H04L 1/00 |
| 2020/0396744 A1* | 12/2020 | Xiong .................. H04L 5/0051 |
| 2021/0028883 A1* | 1/2021 | Wang ................... H04L 5/0053 |
| 2021/0029726 A1* | 1/2021 | Papasakellariou .. H04W 72/535 |
| 2021/0045141 A1* | 2/2021 | Lee ................... H04W 72/1273 |
| 2023/0188294 A1* | 6/2023 | Qu ........................ H04J 13/004 |
| | | 370/329 |

FOREIGN PATENT DOCUMENTS

EP    3480994 A1    5/2019

OTHER PUBLICATIONS

International Search Report and Written Opinion—PCT/US2022/071793—ISA/EPO—Aug. 2, 2022.

* cited by examiner

Primary Examiner — Sai Aung

(57) ABSTRACT

Various aspects of the present disclosure generally relate to wireless communication. In some aspects, a user equipment (UE) may receive, from a base station, an indication of a configuration for a time domain (TD) control resource set (CORESET) for single carrier waveforms that dynamically changes one or more parameters associated with the TD CORESET. The UE may receive, from the base station, a physical downlink control channel based at least in part on the indication of the configuration for the TD CORESET. Numerous other aspects are described.

30 Claims, 18 Drawing Sheets

CONFIGURING A TIME DOMAIN CONTROL RESOURCE SET FOR SINGLE CARRIER WAVEFORMS

FIELD OF THE DISCLOSURE

Aspects of the present disclosure generally relate to wireless communication and to techniques and apparatuses for configuring time domain (TD) control channel element (CCE) bundles for single carrier waveforms.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a UE includes receiving, from a base station, a configuration for a TD CCE bundle that includes at least one TD CCE for single carrier waveforms, wherein a phase continuity is assumed for a duration of the TD CCE bundle; and performing a channel estimation using the TD CCE bundle based at least in part on the phase continuity for the duration of the TD CCE bundle.

In some aspects, a method of wireless communication performed by a base station includes receiving, from a UE, an indication of a UE capability; and transmitting, to the UE and based at least in part on the indication of the UE capability, a configuration for a TD CCE bundle that includes at least one TD CCE for single carrier waveforms, wherein a channel estimation is based at least in part on a phase continuity assumed for a duration of the TD CCE bundle.

In some aspects, a UE for wireless communication includes a memory and one or more processors, coupled to the memory, configured to: receive, from a base station, a configuration for a TD CCE bundle that includes at least one TD CCE for single carrier waveforms, wherein a phase continuity is assumed for a duration of the TD CCE bundle; and perform a channel estimation using the TD CCE bundle based at least in part on the phase continuity for the duration of the TD CCE bundle.

In some aspects, a base station for wireless communication includes a memory and one or more processors, coupled to the memory, configured to: receive, from a UE, an indication of a UE capability; and transmit, to the UE and based at least in part on the indication of the UE capability, a configuration for a TD CCE bundle that includes at least one TD CCE for single carrier waveforms, wherein a channel estimation is based at least in part on a phase continuity assumed for a duration of the TD CCE bundle.

In some aspects, a non-transitory computer-readable medium storing a set of instructions for wireless communication includes one or more instructions that, when executed by one or more processors of a UE, cause the UE to: receive, from a base station, a configuration for a TD CCE bundle that includes at least one TD CCE for single carrier waveforms, wherein a phase continuity is assumed for a duration of the TD CCE bundle; and perform a channel estimation using the TD CCE bundle based at least in part on the phase continuity for the duration of the TD CCE bundle.

In some aspects, a non-transitory computer-readable medium storing a set of instructions for wireless communication includes one or more instructions that, when executed by one or more processors of a base station, cause the base station to: receive, from a UE, an indication of a UE capability; and transmit, to the UE and based at least in part on the indication of the UE capability, a configuration for a TD CCE bundle that includes at least one TD CCE for single carrier waveforms, wherein a channel estimation is based at least in part on a phase continuity assumed for a duration of the TD CCE bundle.

In some aspects, an apparatus for wireless communication includes means for receiving, from a base station, a configuration for a TD CCE bundle that includes at least one TD CCE for single carrier waveforms, wherein a phase continuity is assumed for a duration of the TD CCE bundle; and means for performing a channel estimation using the TD CCE bundle based at least in part on the phase continuity for the duration of the TD CCE bundle.

In some aspects, an apparatus for wireless communication includes means for receiving, from a UE, an indication of a UE capability; and means for transmitting, to the UE and based at least in part on the indication of the UE capability, a configuration for a TD CCE bundle that includes at least one TD CCE for single carrier waveforms, wherein a channel estimation is based at least in part on a phase continuity assumed for a duration of the TD CCE bundle.

In some aspects, a method of wireless communication performed by a UE includes receiving, from a base station, an indication of a configuration for a TD control resource set (CORESET) for single carrier waveforms that dynamically changes one or more parameters associated with the TD CORESET; and receiving, from the base station, a physical downlink control channel (PDCCH) based at least in part on the indication of the configuration for the TD CORESET.

In some aspects, a method of wireless communication performed by a base station includes transmitting, to a UE, an indication of a configuration for a TD CORESET for single carrier waveforms that dynamically changes one or more parameters associated with the TD CORESET; and transmitting, to the UE, a PDCCH based at least in part on the indication of the configuration for the TD CORESET.

In some aspects, a UE for wireless communication includes a memory and one or more processors, coupled to the memory, configured to: receive, from a base station, an indication of a configuration for a TD CORESET for single carrier waveforms that dynamically changes one or more parameters associated with the TD CORESET; and receive, from the base station, a PDCCH based at least in part on the indication of the configuration for the TD CORESET.

In some aspects, a base station for wireless communication includes a memory and one or more processors, coupled to the memory, configured to: transmit, to a UE, an indication of a configuration for a TD CORESET for single carrier waveforms that dynamically changes one or more parameters associated with the TD CORESET; and transmit, to the UE, a PDCCH based at least in part on the indication of the configuration for the TD CORESET.

In some aspects, a non-transitory computer-readable medium storing a set of instructions for wireless communication includes one or more instructions that, when executed by one or more processors of a UE, cause the UE to: receive, from a base station, an indication of a configuration for a TD CORESET for single carrier waveforms that dynamically changes one or more parameters associated with the TD CORESET; and receive, from the base station, a PDCCH based at least in part on the indication of the configuration for the TD CORESET.

In some aspects, a non-transitory computer-readable medium storing a set of instructions for wireless communication includes one or more instructions that, when executed by one or more processors of a base station, cause the base station to: transmit, to a UE, an indication of a configuration for a TD CORESET for single carrier waveforms that dynamically changes one or more parameters associated with the TD CORESET; and transmit, to the UE, a PDCCH based at least in part on the indication of the configuration for the TD CORESET.

In some aspects, an apparatus for wireless communication includes means for receiving, from a base station, an indication of a configuration for a TD CORESET for single carrier waveforms that dynamically changes one or more parameters associated with the TD CORESET; and means for receiving, from the base station, a PDCCH based at least in part on the indication of the configuration for the TD CORESET.

In some aspects, an apparatus for wireless communication includes means for transmitting, to a UE, an indication of a configuration for a TD CORESET for single carrier waveforms that dynamically changes one or more parameters associated with the TD CORESET; and means for transmitting, to the UE, a PDCCH based at least in part on the indication of the configuration for the TD CORESET.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
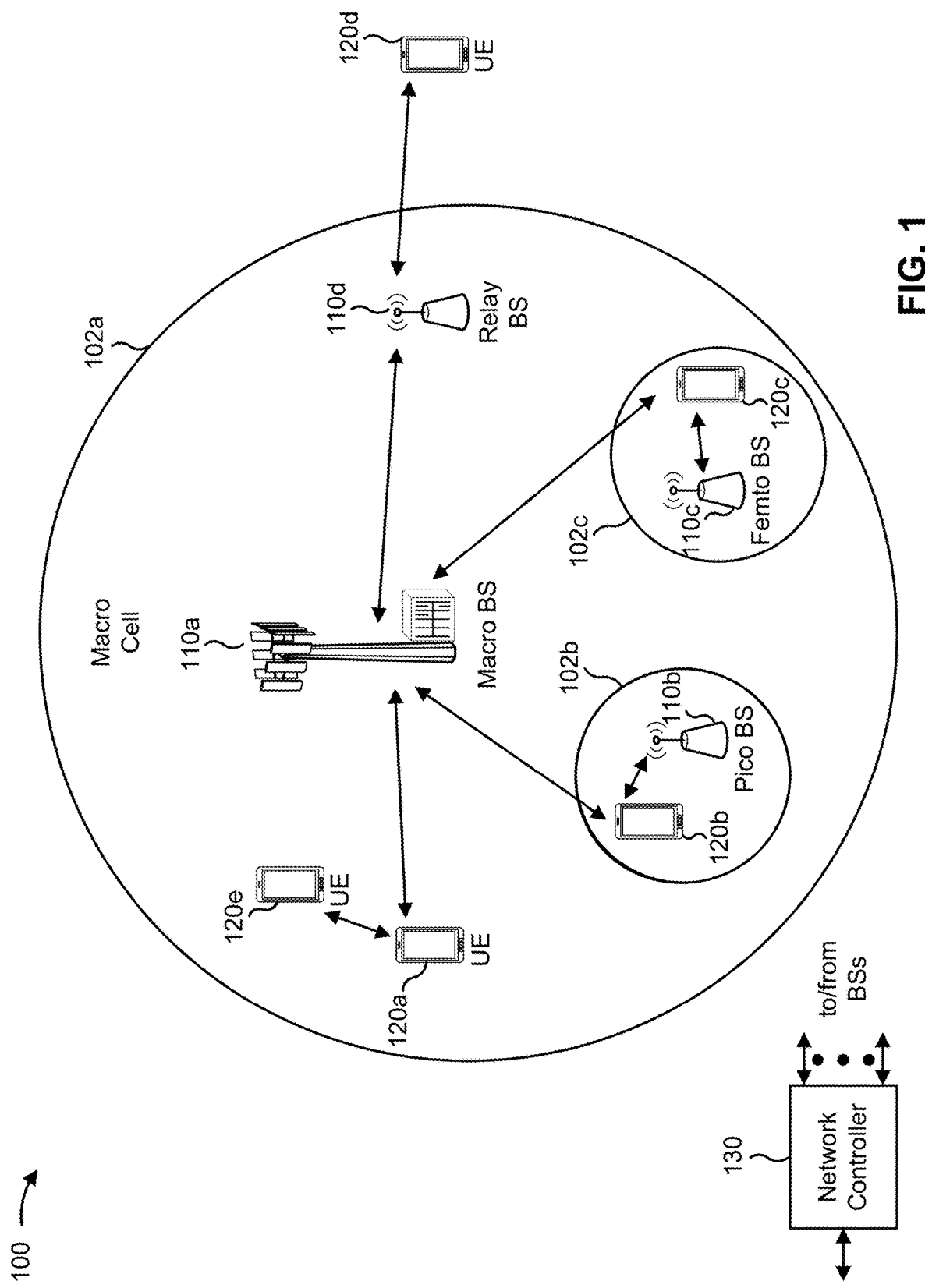
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG.

1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
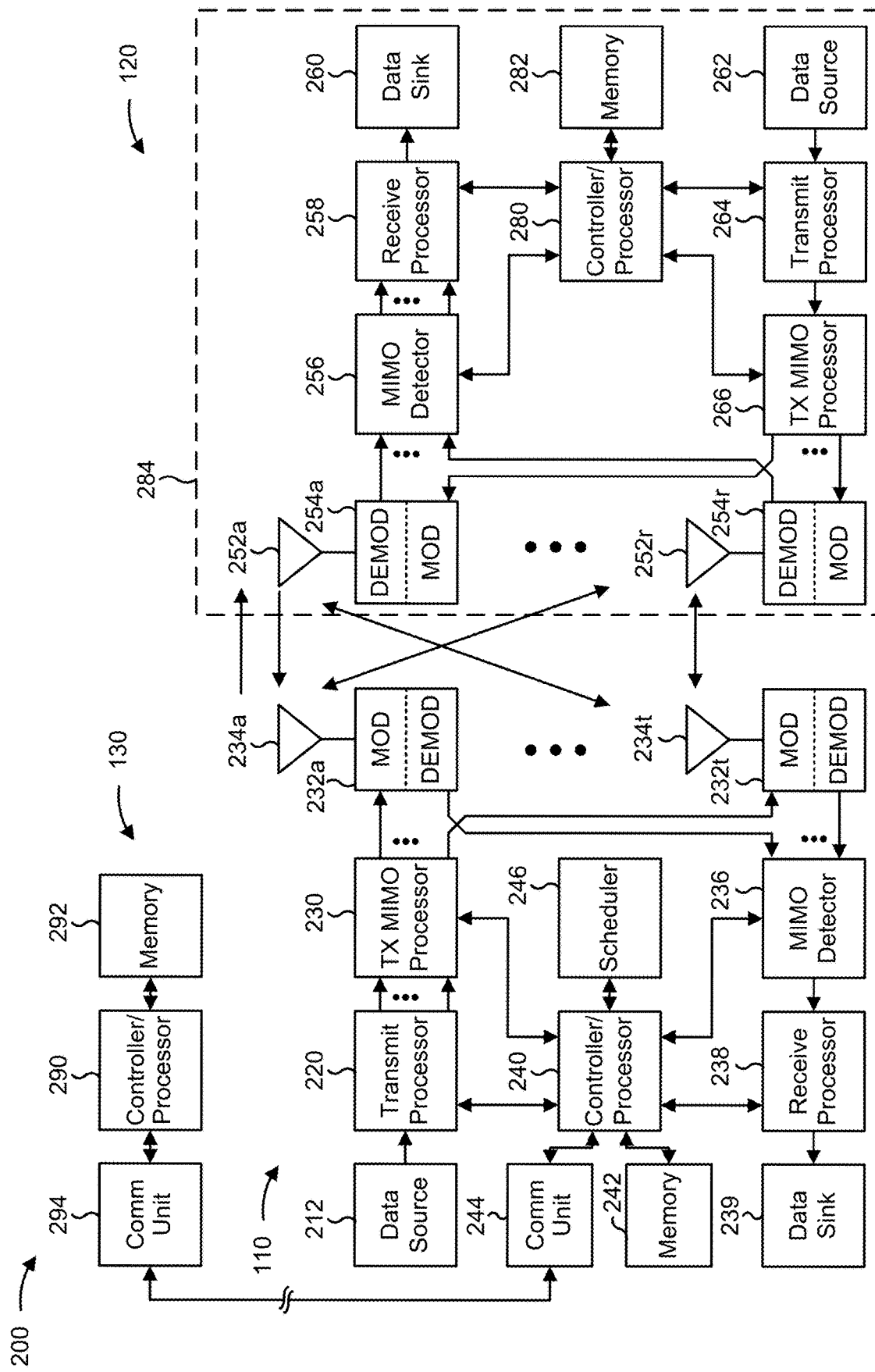
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/ or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-16).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-16).

Controller/processor 240 of base station 110, controller/ processor 280 of UE 120, and/or any other component(s) of FIG. 2 may perform one or more techniques associated with configuring TD CCE bundles and/or TD CORESETs for single carrier waveforms, as described in more detail elsewhere herein. For example, controller/processor 240 of base station 110, controller/processor 280 of UE 120, and/or any other component(s) of FIG. 2 may perform or direct operations of, for example, process 1300 of FIG. 13, process 1400 of FIG. 14, process 1500 of FIG. 15, process 1600 of FIG. 16, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1300 of FIG. 13, process 1400 of FIG. 14, process 1500 of FIG. 15, process 1600 of FIG. 16, and/or other processes as described herein. In some aspects, executing instructions may include running the instructions, converting the instructions, compiling the instructions, and/or interpreting the instructions, among other examples.

In some aspects, a UE (e.g., UE 120) includes means for receiving, from a base station, a configuration for a TD CCE bundle that includes at least one TD CCE for single carrier waveforms, wherein a phase continuity is assumed for a duration of the TD CCE bundle; and/or means for performing a channel estimation using the TD CCE bundle based at least in part on the phase continuity for the duration of the TD CCE bundle.

In some aspects, the UE includes means for receiving, from a base station, an indication of a configuration for a TD CORESET for single carrier waveforms that dynamically changes one or more parameters associated with the TD CORESET; and/or means for receiving, from the base station, a PDCCH based at least in part on the indication of the configuration for the TD CORESET.

The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, a base station (e.g., base station 110) includes means for receiving, from a UE, an indication of a UE capability; and/or means for transmitting, to the UE and based at least in part on the indication of the UE capability, a configuration for a TD CCE bundle that includes at least one TD CCE for single carrier waveforms, wherein a channel estimation is based at least in part on a phase continuity assumed for a duration of the TD CCE bundle.

In some aspects, the base station includes means for transmitting, to a UE, an indication of a configuration for a TD CORESET for single carrier waveforms that dynamically changes one or more parameters associated with the TD CORESET; and/or means for transmitting, to the UE, a PDCCH based at least in part on the indication of the configuration for the TD CORESET.

The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

In higher NR operating bands, larger bandwidths may be desirable. Several waveforms may be used for downlink operations in the larger bandwidths of the higher NR operating bands. For example, waveforms associated with a single carrier frequency domain implementation (e.g., DFT-s-OFDM waveforms) may provide a relatively low peak-to-average power ratio (PAPR) and better coverage, single tap frequency domain equalization (FDE), and/or efficient bandwidth utilization without use of a guard band. Some single carrier waveforms, such as DFT-s-OFDM waveforms, may be associated with the single carrier frequency domain implementation.

As another example, waveforms associated with a single carrier TD implementation (e.g., single carrier quadrature amplitude modulation (SC-QAM) waveforms) may provide a relatively low PAPR and better coverage, and/or a relatively low complexity due to no Fast Fourier Transform (FFT) or Inverse Fast Fourier Transform (IFFT). Further, a cyclic prefix (CP) may be added to allow for FDE implementation. Some single carrier waveforms, such as SC-QAM waveforms, may be associated with the single carrier TD implementation.

As yet another example, OFDM waveforms may provide a relatively high PAPR, a relatively high signal-to-noise ratio (SNR), relatively high spectral efficiency, high order MIMO that enables relatively high data rates, single tap FDE, efficient bandwidth utilization without usage of a guard band, and/or relatively straightforward frequency division multiplexing (FDM) capability.

Figure 3:
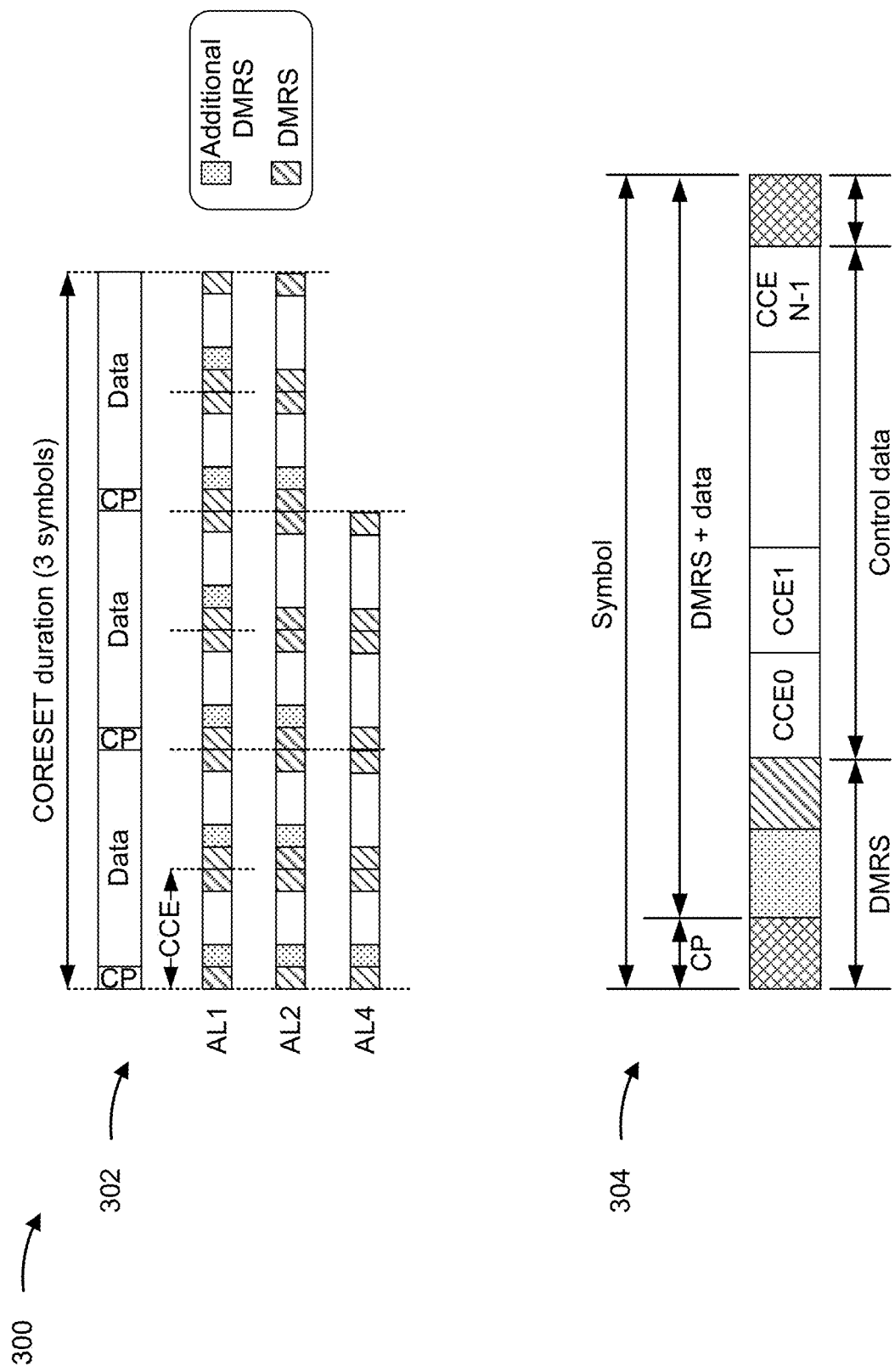
FIG. 3 is a diagram illustrating examples of TD CORESETs, in accordance with the present disclosure.

FIG. 3 is a diagram illustrating examples 300 of TD CORESETs, in accordance with the present disclosure.

As shown by reference number 302, a TD CORESET may be associated with a first TD CCE design. The TD CORESET may have a duration of X symbols, where each symbol may be associated with a CP and data. The TD CORESET may include multiple CCEs. In the first CCE design, a CCE may be a self-contained CCE. A self-contained CCE may be associated with a DMRS and a CP that is specific to that CCE. A self-contained CCE may include one or more DMRSs and may include an additional DMRS, depending on an aggregation level.

As shown by reference number 304, a TD CORESET may be associated with a second TD CCE design. The TD CORESET may have a duration of X symbols. Each symbol may be associated with a CP, and a DMRS and data portion. The DMRS and data portion may include a DMRS, an additional DMRS, and one or more CCEs (e.g., CCE0, CCE1, and so on). In the second TD CCE design, the DMRS, the additional DMRS, and the CP may be shared between multiple CCEs. In other words, the DMRS, the additional DMRS, and the CP may not be specific to a given CCE (e.g., a CCE is not self-contained), but rather may be shared between the multiple CCEs.

As indicated above, FIG. 3 is provided as an example. Other examples may differ from what is described with regard to FIG. 3.

One or more symbols of a same bandwidth may be bundled to form a TD CORESET. The TD CORESET may be divided into TD CCEs. DMRS samples may be assigned on each CCE, which may enable a per-CCE channel estimation. The per-CCE channel estimation may be based at least in part on an FDE and/or a time domain equalization (TDE) at a receiver. Further, CCEs may be aggregated to form a PDCCH candidate, where a starting CCE index for the PDCCH candidate may be based at least in part on a hashing function.

Signals may be time division multiplexed for single carrier waveforms. Multiple CCEs may be time division multiplexed for single carrier waveforms. In this case, a phase continuity assumption across multiple TD CCEs may not be defined at a UE. The UE may need to correctly combine or aggregate the multiple TD CCEs across one or more symbols together, and may not properly combine the multiple TD CCEs across the one or more symbols when the phase continuity assumption across the multiple TD CCEs is not defined. On the other hand, when a CCE is per symbol in accordance with a current CCE design, the UE may not need to make a phase continuity assumption across symbols because the UE may receive a DMRS in each symbol, and the DMRS may indicate a frequency domain channel for that channel.

For example, when a CCE aggregation level is greater than one (e.g., multiple CCEs are aggregated), or when CCE combining is supported, the UE may perform a channel estimation per N consecutive CCEs, where N is a quantity of TD CCEs with a same phase assumption. Without an indication of the phase continuity assumption across the N TD CCEs over one or more symbols, the UE may be unable to perform the channel estimation per N consecutive CCEs.

Further, a quantity of UEs that need to be multiplexed in a TD CORESET may change over time. A UE coverage may change over time, and aggregation levels for a certain PDCCH may also change based at least in part on the change to the UE coverage. However, a quantity of TD CCEs allocated for a certain CORESET may be static, and may not be able to account for the quantity of changing UEs that need to be multiplexed in the TD CORESET.

In various aspects of techniques and apparatuses described herein, a UE may receive, from a base station, a configuration for a TD CCE bundle that includes at least one TD CCE for single carrier waveforms. The UE may assume a phase continuity for a duration of the TD CCE bundle based at least in part on a receipt of the configuration. The UE may perform a channel estimation using the TD CCE bundle based at least in part on the phase continuity for the duration of the TD CCE bundle. In other words, based at least in part on the assumption of the phase continuity for the duration of the TD CCE bundle, the UE may be able to accurately perform the channel estimation using the TD CCE bundle. Without the configuration for the TD CCE bundle, the UE may not be aware of the phase continuity for the duration of the TD CCE bundle, and a resulting channel estimation may be affected.

In various aspects of techniques and apparatuses described herein, the UE may receive, from the base station, a configuration for a TD CORESET for single carrier waveforms. The configuration may dynamically change one or more parameters associated with the TD CORESET. The one or more parameters may include a quantity of TD CCEs. In other words, a certain CORESET may include a variable or dynamic quantity of TD CCEs, which may be adjusted based at least in part on the configuration. The variable or dynamic quantity of TD CCEs may be adjusted based at least in part on the quantity of UEs that need to be multiplexed for that TD CORESET. The UE may receive, from the base station, a PDCCH based at least in part on the configuration for the TD CORESET.

Figure 4:
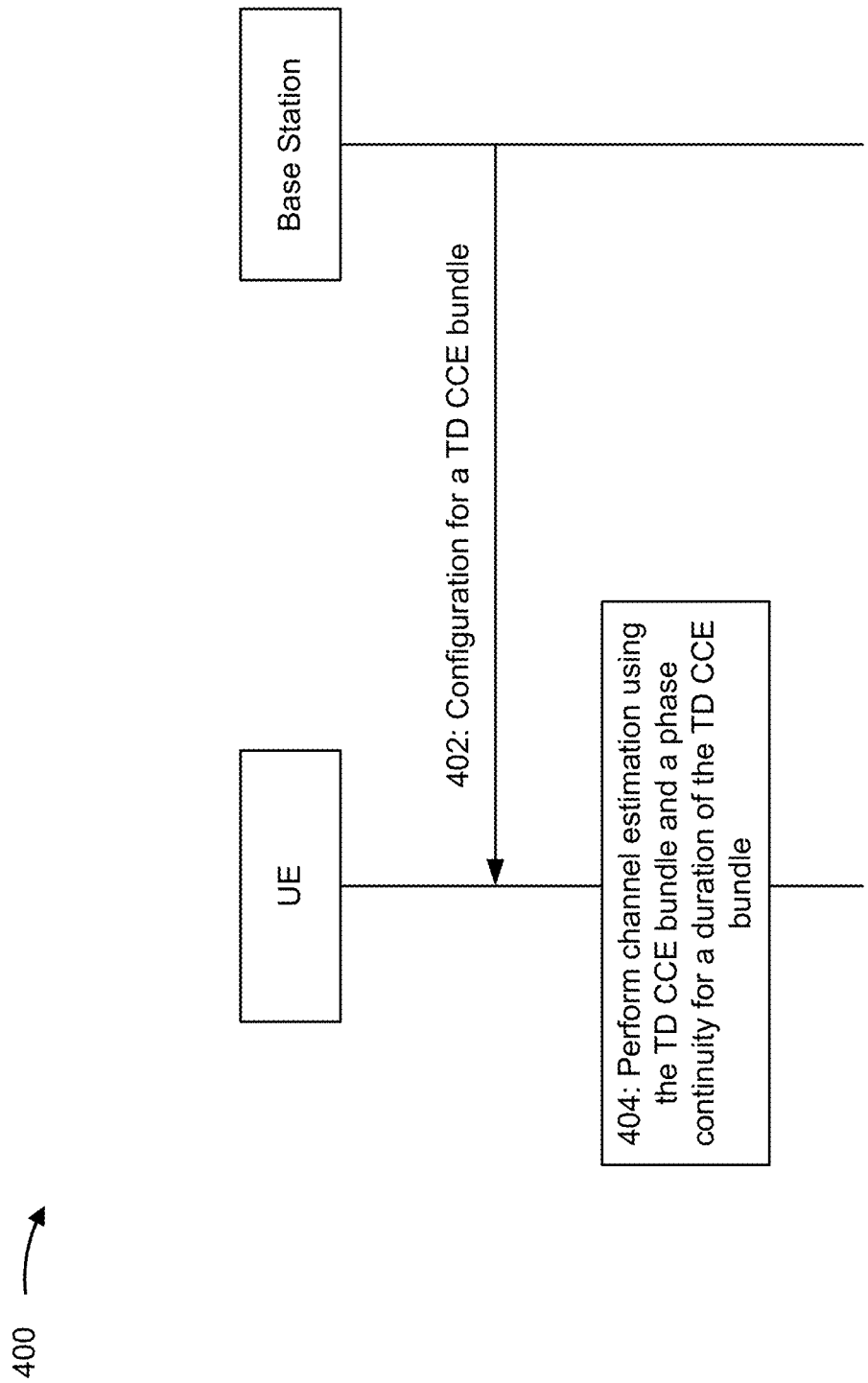
FIG. 4 is a diagram illustrating an example associated with configuring TD CCE bundles for single carrier waveforms, in accordance with the present disclosure.

FIG. 4 is a diagram illustrating an example 400 of configuring TD CCE bundles for single carrier waveforms, in accordance with the present disclosure. As shown in FIG. 4, example 400 includes communication between a UE (e.g., UE 120) and a base station (e.g., base station 110). In some aspects, the UE and the base station may be included in a wireless network such as wireless network 100.

As shown by reference number 402, the UE may receive, from the base station, a configuration for a TD CCE bundle that includes at least one TD CCE for single carrier waveforms. A "TD CCE bundle" may include one or more TD CCEs. A single carrier waveform may be associated with a single signal frequency to transmit data symbols. The TD CCE bundle may span one or more symbols, and the TD CCE bundle may include one or more DMRSs. The TD CCE bundle may be contiguous in time. For example, each TD CCE in the TD CCE bundle may be contiguous with at least one other TD CCE in the TD CCE bundle. Alternatively, the TD CCE bundle may be non-contiguous in time and the TD CCE bundle may include TD CCEs that are separated by a symbol or a CCE associated with another UE. Further, the UE may assume a phase continuity for a duration of the TD CCE bundle based at least in part on a receipt of the configuration for the TD CCE bundle.

In some aspects, the UE may transmit, to the base station, an indication of a UE capability of a TD CCE phase continuity of a defined duration. The indication may indicate that the UE supports a TD CCE phase continuity of a certain duration. The base station may transmit the configuration for the TD CCE bundle based at least in part on the indication of the UE capability.

In some aspects, the configuration for the TD CCE bundle may be associated with one or more CORESETs. In some aspects, the configuration for the TD CCE bundle may indicate a quantity associated with the at least one TD CCE in the TD CCE bundle, a distribution of the TD CCE bundle that indicates whether gaps are present in the TD CCE bundle, and/or a quantity and locations of DMRSs within the TD CCE bundle.

In some aspects, the configuration for the TD CCE bundle may be a first configuration. The UE may receive, from the base station, a second configuration for a TD aggregation of one or more TD control elements. A TD control element of the one or more TD control elements may be a TD CCE or a TD CCE bundle.

In some aspects, the TD aggregation may be associated with contiguous TD control elements. In some aspects, the TD aggregation may be associated with non-contiguous TD control elements. In some aspects, the TD aggregation may be based at least in part on a pattern of contiguous TD control elements and non-contiguous TD control elements.

In some aspects, TD CCE bundles associated with the TD aggregation may be associated with a same bundle size. In some aspects, TD CCE bundles associated with the TD aggregation may be associated with different bundle sizes. In some aspects, TD control elements (e.g., TD CCEs or TD CCE bundles) associated with the TD aggregation may be associated with a same TD CORESET or different TD CORESETs. In some aspects, TD control elements associated with the TD aggregation may be associated with a same TD symbol or different TD symbols.

As shown by reference number 404, the UE may perform a channel estimation using the TD CCE bundle based at least in part on the phase continuity for the duration of the TD CCE bundle. The channel estimation may be a measurement (in dB) of a channel based at least in part on DMRSs associated with the TD CCE bundle. The phase may be continuous when a same phase noise level (or a phase noise level within a threshold range) is associated with each of the TD CCEs in the TD CCE bundle, such that the phase may be continuous for the duration of the TD CCE bundle. In other words, based at least in part on the assumption of the phase continuity for the duration of the TD CCE bundle, the UE may be able to perform the channel estimation using the TD CCE bundle.

In some aspects, for a TD aggregation of one or more TD control elements (e.g., TD CCEs or TD CCE bundles), the channel estimation may be associated with a plurality of TD-aggregated TD CCEs, or different channel estimations may be associated with different groups within the plurality of TD-aggregated TD CCEs. In some aspects, the channel estimation may be per TD CCE bundle associated with the TD aggregation.

In some aspects, a same channel estimation may be associated with non-contiguous TD control elements, or different channel estimations may be associated with different non-contiguous TD control elements. A same DMRS may be shared when the same channel estimation is used.

In some aspects, multiple TD control elements (e.g., multiple TD CCEs or multiple TD CCE bundles) may be associated with different beams and different transmission configuration indicator (TCI) states. The multiple TD control elements may be associated with a same CORESET or different CORESETs. The multiple TD control elements may be associated with a same aggregated TD CCE or different aggregated TD CCEs. The multiple TD control elements may be associated with a same TD symbol or different TD symbols.

In one example, the multiple TD control elements (e.g., TD CCEs or TD CCE bundles) associated with the different beams and the different TCI states may be time division multiplexed. A beam switching gap may be inserted between TD control elements associated with the different beams when a CP length is not sufficient to include a beam switching delay. In some aspects, the multiple TD control elements associated with the different beams and the different TCI states may be spatial division multiplexed, and the multiple TD control elements may use a same bandwidth or different bandwidths based at least in part on a UE capability. In some aspects, the multiple TD control elements associated with the different beams and the different TCI states may be frequency division multiplexed, and the multiple TD control elements may use a same bandwidth or different bandwidths based at least in part on a UE capability. Further, when frequency division multiplexing is used, a guard band may be inserted between the TD control elements. Further, the multiple TD control elements associated with the different beams may be associated with separate channel estimations.

As indicated above, FIG. 4 is provided as an example. Other examples may differ from what is described with regard to FIG. 4.

Figure 5:
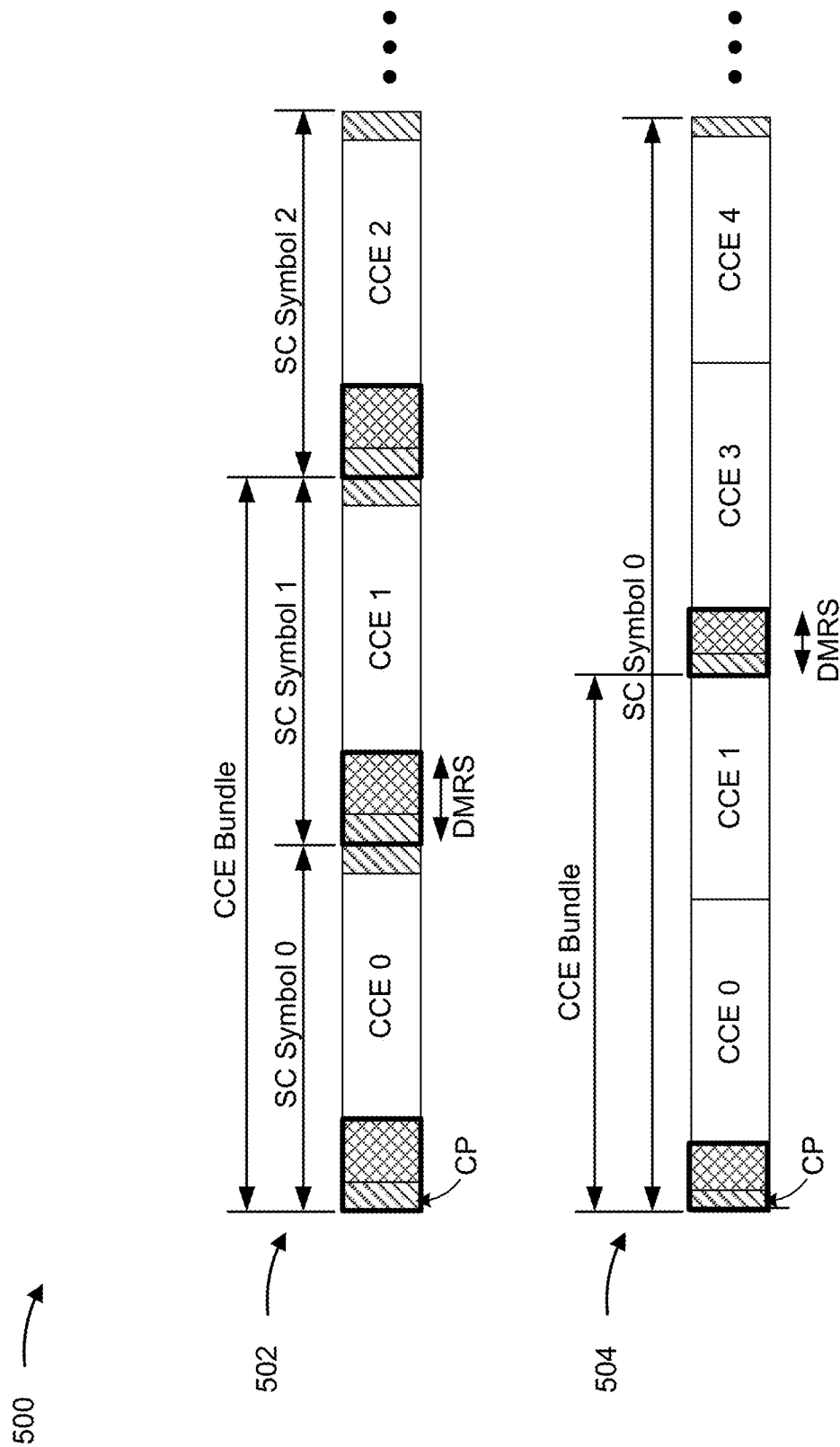
FIG. 5 is a diagram illustrating examples associated with TD CCE bundles, in accordance with the present disclosure.

FIG. 5 is a diagram illustrating examples 500 of TD CCE bundles, in accordance with the present disclosure.

As shown by reference number 502, a TD CCE bundle may be associated with multiple DMRSs. The TD CCE bundle may include two single carrier (SC) symbols. Each SC symbol (e.g., SC Symbol 0, SC Symbol 1, and SC Symbol 2) may be associated with a CP, a DMRS, and a CCE.

As shown by reference number 504, a TD CCE bundle may be associated with a single DMRS. The TD CCE bundle may span a portion of an SC symbol (SC symbol 0). The TD CCE bundle may include a CP, a DMRS, and multiple CCEs.

As indicated above, FIG. 5 is provided as an example. Other examples may differ from what is described with regard to FIG. 5.

In some aspects, a TD CCE bundle may be contiguous in time. Alternatively, the TD CCE bundle may be non-contiguous in time. For example, the TD CCE bundle may include a first CCE and a second CCE that is separated by a symbol used for other UEs or other transmissions.

Figure 6:
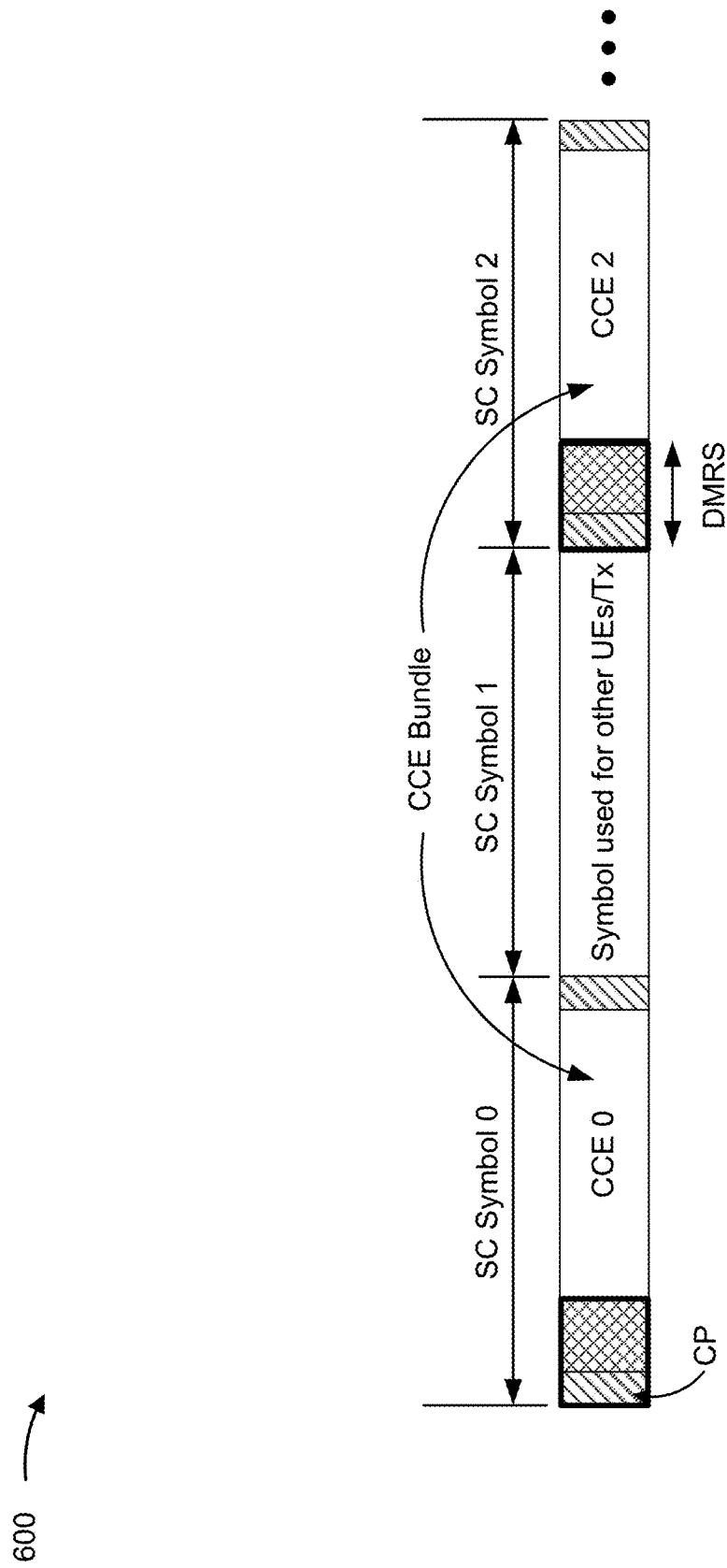
FIG. 6 is a diagram illustrating an example associated with a non-contiguous TD CCE bundle, in accordance with the present disclosure.

FIG. 6 is a diagram illustrating an example 600 of a non-contiguous TD CCE bundle, in accordance with the present disclosure.

As shown in FIG. 6, a CCE bundle may include a first CCE (CCE 0) in a first SC symbol (SC Symbol 0) and a second CCE (CCE 0) in a third SC symbol (SC Symbol 2). A second SC symbol (SC Symbol 1) between the first SC symbol and the third SC symbol may include a symbol used for other UEs or other transmissions. Thus, in this example, the CCE bundle included in the first SC symbol and the third SC symbol may be non-contiguous in time.

As indicated above, FIG. 6 is provided as an example. Other examples may differ from what is described with regard to FIG. 6.

In some aspects, a UE may transmit a capability report to a base station. The capability report may indicate a capability of the UE for a TD CCE phase continuity. The capability report may indicate that the UE is capable of handling a TD CCE phase continuity for a certain time or for over a time window. A capability for the TD CCE phase continuity may be different among UEs. For example, a first UE may be capable of handling a TD CCE phase continuity for a first time duration, while a second UE may be capable of handling a TD CCE phase continuity for a second time duration.

In some aspects, the UE may receive, from the base station, a TD CCE bundle configuration based at least in part on the capability report. The TD CCE bundle configuration may indicate a quantity of CCEs in a TD CCE bundle, a distribution of the TD CCE bundle in time (e.g., if gaps are present in the TD CCE bundle), and/or a quantity and locations of DMRSs within the TD CCE bundle. In other words, the capability report may indicate a period of time for which the UE may assume a phase continuity across TD CCEs, and based at least in part on the capability report, the base station may transmit the TD CCE bundle configuration that indicates the quantity of CCEs in the TD CCE bundle. The quantity of CCEs in the TD CCE bundle may not span a time period that is greater than the capability of the UE.

In some aspects, the TD CCE bundle configuration may be (pre)configured for the UE, and the UE may perform an initial access based at least in part on the TD CCE bundle configuration.

CCE to resource element group (REG) mapping may include interleaved CCE-to-REG mapping or non-interleaved CCE-to-REG mapping, depending on whether frequency diversity is desired or frequency selectivity is desired. For the non-interleaved CCE-to-REG mapping, CCEs may be mapped to consecutive (in frequency) REGs. For example, an REG bundle size may be equal to six. For the interleaved CCE-to-REG mapping, CCEs may be mapped to non-consecutive (in frequency) REGs. An REG bundle size may be equal to two, three, or six depending on a CORESET quantity of symbols.

CCE aggregation may be employed to increase a PDCCH coverage, where multiple CCEs may be aggregated together to transmit a PDCCH. An aggregation level may be one, two, four, eight, or sixteen CCEs. A PDCCH candidate may correspond to an aggregation level.

In some aspects, the CCE aggregation may be based at least in part on a TD CCE structure, in which a TD CCE bundle may include one or more TD CCEs, and in which a UE may assume a phase continuity within a CCE bundle duration. In the TD CCE structure, the TD CCE bundle may be contiguous in time or non-contiguous in time.

In some aspects, to increase a PDCCH coverage, a base station may configure a UE with a TD aggregation of one or more TD control elements. In some aspects, a TD control element may be a TD CCE. For example, a channel estimation may be the same for aggregated TD CCEs, or a base station may indicate that different channel estimation is needed for different groups within the aggregated TD CCEs. In some aspects, a TD control element may be a TD CCE bundle. For example, a UE may assume a phase continuity within a TD CCE bundle duration, and a channel estimation may be performed per TD CCE bundle.

Figure 7:
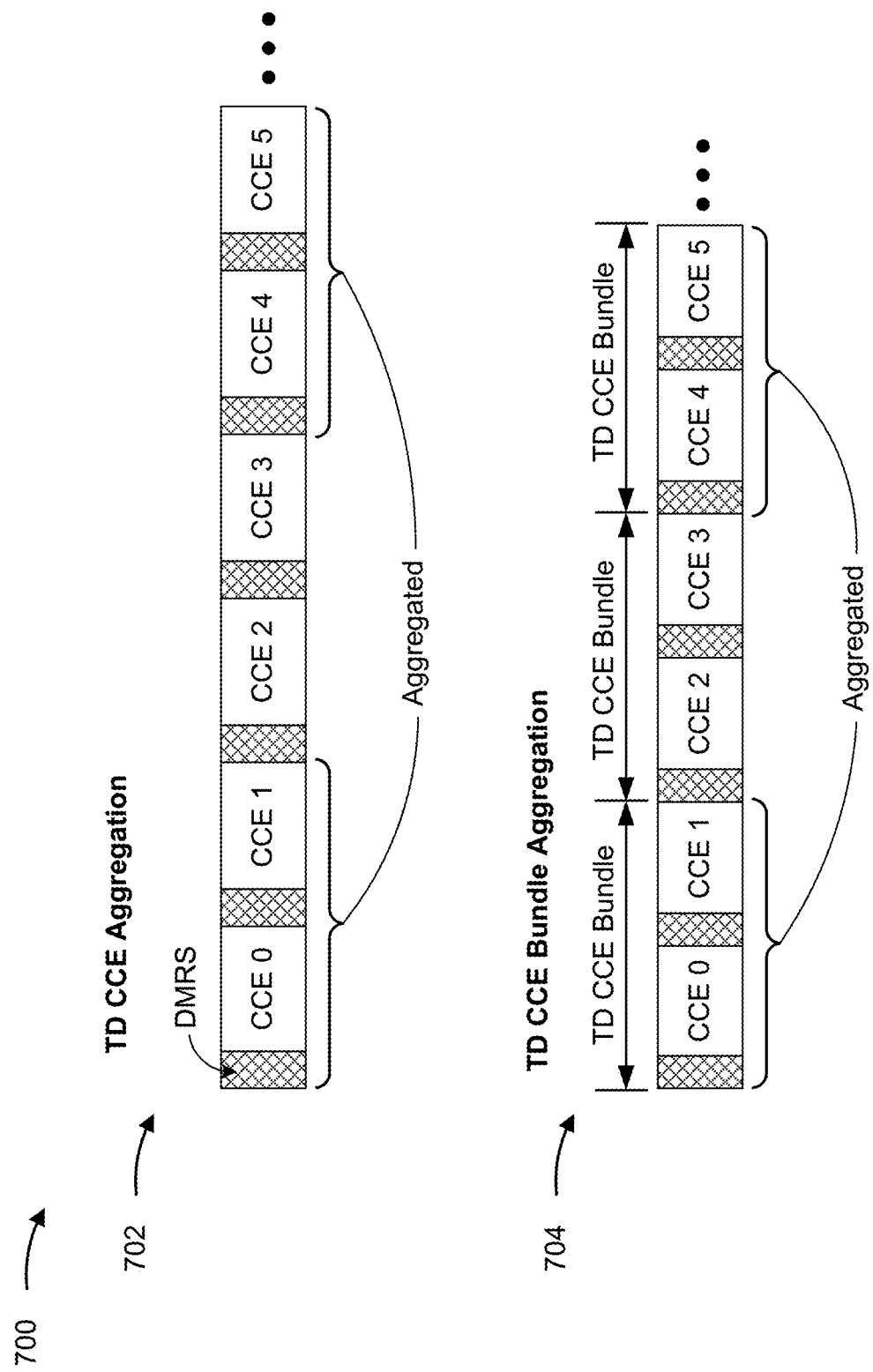
FIG. 7 is a diagram illustrating examples associated with a TD aggregation of one or more TD control elements, in accordance with the present disclosure.

FIG. 7 is a diagram illustrating examples 700 associated with a TD aggregation of one or more TD control elements, in accordance with the present disclosure.

As shown by reference number 702, in a TD CCE aggregation, two or more TD CCEs may be aggregated to be contiguous in time and/or non-contiguous in time. A TD CCE may be associated with a DMRS. In this example, CCE 0, CCE 1, CCE 4, and CCE 5 may be CCEs that are aggregated together to form the TD CCE aggregation. Further, a channel estimation may be the same for aggregated CCEs, or a different channel indication may be needed for different groups within the aggregated CCEs.

As shown by reference number 704, in a TD CCE bundle aggregation, two or more TD CCE bundles may be aggregated continuous in time and/or non-contiguous in time. A TD CCE bundle may be associated with a DMRS. A TD CCE bundle may include two or more CCEs. In this example, a first TD CCE bundle may include CCE 0 and CCE 1, a second TD CCE bundle may include CCE 2 and CCE 3, and a third TD CCE bundle may include CCE 4 and CCE 5. Further, a UE may assume a phase continuity within a TD CCE bundle duration, and channel estimation may be performed per TD CCE bundle.

As indicated above, FIG. 7 is provided as an example. Other examples may differ from what is described with regard to FIG. 7.

In some aspects, the TD aggregation of one or more TD control elements may be for time contiguous TD CCEs or TD CCE bundles. In some aspects, the TD aggregation of one or more TD control elements may be for time non-contiguous TD CCEs or TD CCE bundles, for example, to achieve time diversity. Non-contiguous in time TD CCEs may or may not be associated with different channel estimates, which may be specified or indicated by a base station. A same DMRS may be shared with the TD CCEs when a same channel estimate is used. In some aspects, the TD aggregation of one or more TD control elements may be based at least in part on a pattern of contiguous and non-contiguous in time TD CCEs or TD CCE bundles.

In some aspects, aggregated TD CCE bundles may be of a same or different bundle sizes. For example, a first aggregated TD CCE bundle may have a first quantity of TD CCEs and a second aggregated TD CCE bundle may have a second quantity of TD CCEs. A configuration of a bundle size may be indicated by a base station.

In some aspects, aggregated TD CCEs or aggregated TD CCE bundles may be associated with (e.g., belong to) a same TD CORESET. In some aspects, aggregated TD CCEs or aggregated TD CCE bundles may be associated with (e.g., belong to) different TD CORESETs. In some aspects, aggregated TD CCEs or aggregated TD CCE bundles may be associated with (e.g., belong to) a same TD CORESET. In some aspects, aggregated TD CCEs or aggregated TD CCE bundles may be associated with (e.g., belong to) different TD symbols.

As a subcarrier spacing (SCS) is increased, a corresponding symbol time and a CP time may decrease proportionally. The SCS may be 15 kHz, 30 kHz, 60 kHz, and so on up to 1920 kHz. As the SCS increases, the symbol time and the CP time may also increase. For example, for a numerology ($\mu$) of 0, an SCS (in kHz) is 15 kHz, a CP time (Tcp, in ns) is approximately 4687 ns, and a symbol time (Tsymb, in ns) is approximately 66,666 ns. For a $\mu$ of 2, an SCS is 60 kHz, a CP time is approximately 1172 ns, and a symbol time is approximately 16,666 ns. For a $\mu$ of 4, an SCS is 240 kHz, a CP time is approximately 293 ns, and a symbol time is approximately 4166 ns. For a $\mu$ of 6, an SCS is 960 kHz, a CP time is approximately 73 ns, and a symbol time is approximately 1041 ns.

Beam switching gaps may be needed between consecutive allocations with different beams to facilitate a gNB/UE beam switch delay, which may be approximated by about 100 ns.

Figure 8:
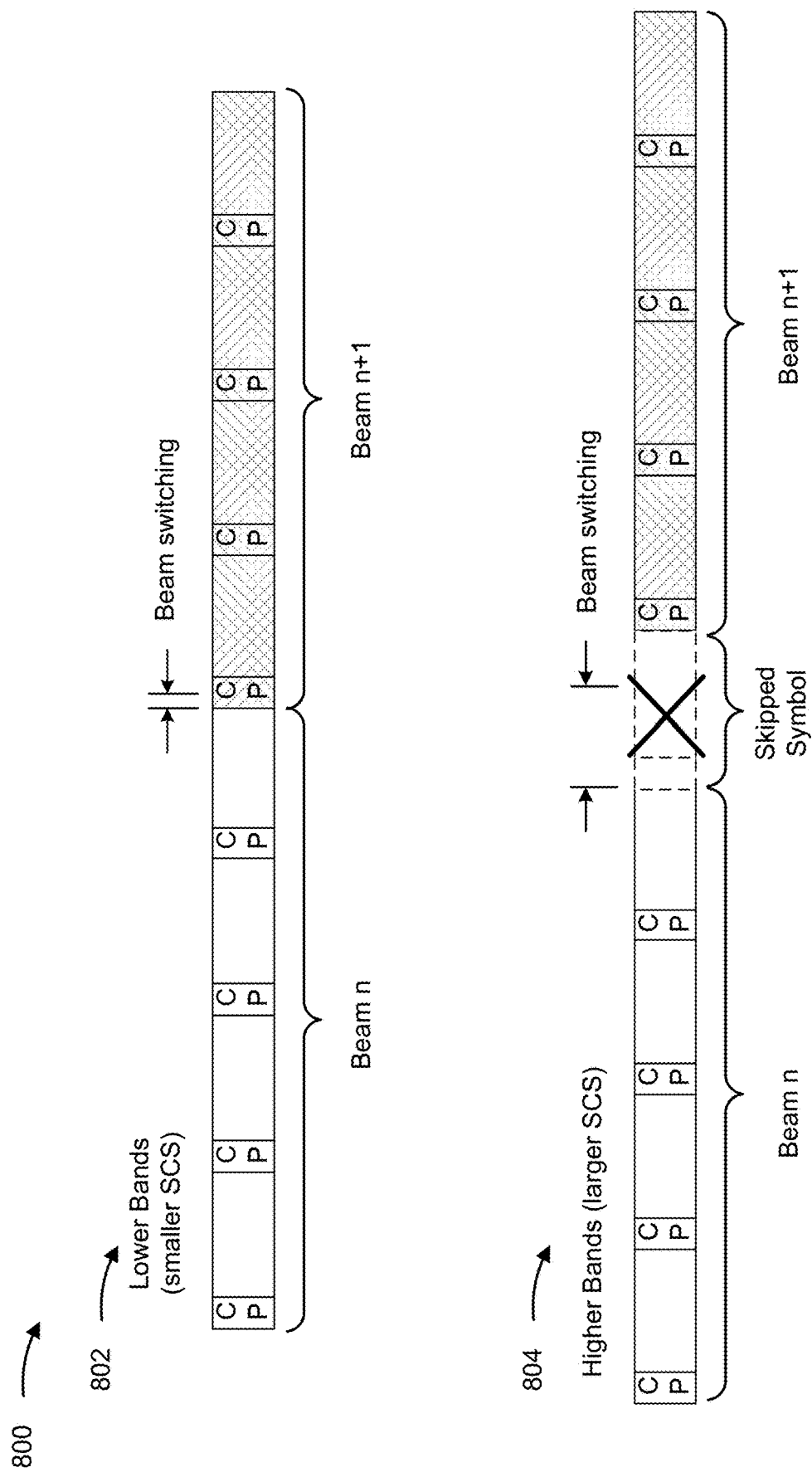
FIG. 8 is a diagram illustrating examples associated with beam switching gaps, in accordance with the present disclosure.

FIG. 8 is a diagram illustrating examples 800 associated with beam switching gaps, in accordance with the present disclosure.

As shown by reference number 802, for lower bands with a smaller SCS, a CP length may be sufficiently long (e.g., greater than 100 ns) to absorb a beam switching gap. The beam switching gap may occur between first communications associated with a first beam (beam n) and second communications associated with a second beam (beam n+1).

As shown by reference number 804, for higher bands with a larger SCS, a CP length may not be sufficiently long to absorb a beam switching gap. In this case, a symbol-level gap may be needed because absorbing the beam switching gap in the CP length is not feasible. In other words, the beam switching gap may be longer than the CP length, so the symbol-level gap may be used, which may result in a skipped symbol. The skipped symbol for the beam switching may occur between first communications associated with a first beam (beam n) and second communications associated with a second beam (beam n+1).

As indicated above, FIG. 8 is provided as an example. Other examples may differ from what is described with regard to FIG. 8.

A TD CCE design may be used for single carrier waveforms and for higher bands. A beam (spatial) and/or time diversity may be used for UEs/gNBs with single panels based at least in part on a time division multiplexing structure for TD CCEs. In some cases, multiple beams may be used for UEs/gNBs with multiple panels based at least in part on a spatial division multiplexing. Beam diversity for TD CCEs may be useful for interference mitigation, short beam blockage mitigation, beam loading (e.g., resource utilization), and/or user multiplexing.

In some aspects, multiple TD CCEs or TD CCE bundles may be transmitted from different gNB beams. The different gNB beams may be associated with different panels. The multiple TD CCEs or TD CCE bundles may be transmitted using different transmission configuration indicator (TCI) states. In some aspects, the multiple TD CCEs or TD CCE bundles may be associated with (e.g., belong to) a same TD CORESET. In some aspects, the multiple TD CCEs or TD CCE bundles may be associated with (e.g., belong to) different TD CORESETs. In some aspects, the multiple TD CCEs or TD CCE bundles may be associated with (e.g., belong to) a same aggregated CCE. In some aspects, the multiple TD CCEs or TD CCE bundles may be associated with (e.g., belong to) different aggregated CCEs. In some aspects, the multiple TD CCEs or TD CCE bundles may be associated with (e.g., belong to) a same TD symbol. In some aspects, the multiple TD CCEs or TD CCE bundles may be associated with (e.g., belong to) a different TD symbol.

Figure 9:
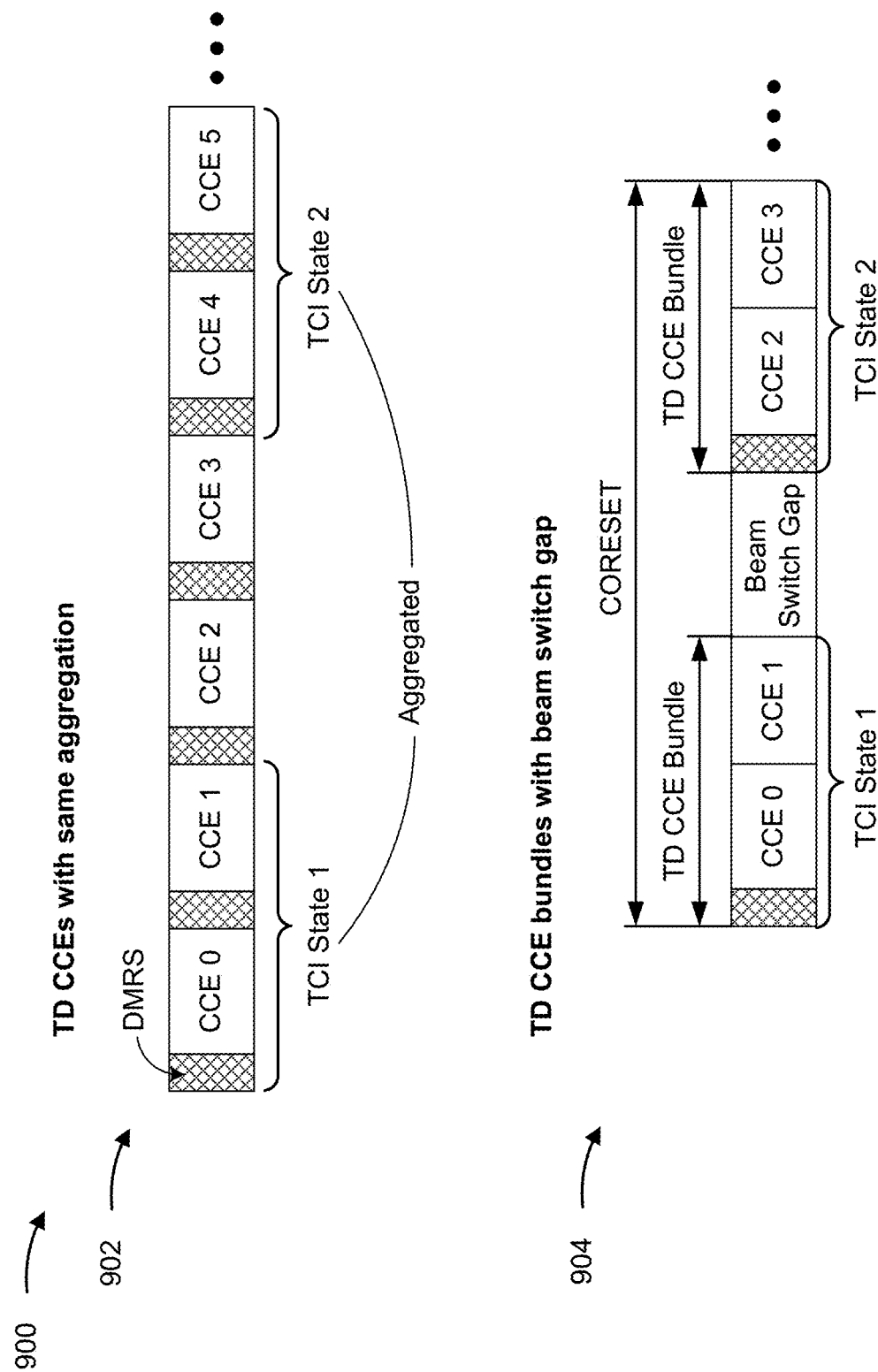
FIG. 9 is a diagram illustrating examples associated with multiple TD CCEs or TD CCE bundles corresponding to different beams, in accordance with the present disclosure.

FIG. 9 is a diagram illustrating examples 900 associated with multiple TD CCEs or TD CCE bundles corresponding to different beams, in accordance with the present disclosure.

As shown by reference number 902, multiple TD CCEs may belong to the same aggregated CCEs. For example, CCE 0 and CCE 1 may be associated with a first beam (e.g., TCI state 1), and CCE 4 and CCE 5 may be associated with a second beam (e.g., TCI state 2). The first beam may be associated with a first panel and the second beam may be associated with a second panel. Further, CCE 0 and CCE 1 may be aggregated with CCE 4 and CCE 5.

As shown by reference number 904, multiple TD CCE bundles may belong to a same CORESET. For example, a first TD CCE bundle may be associated with CCE 0 and CCE 1. The first TD CCE bundle may be associated with a first beam (e.g., TCI state 1). A second TD CCE bundle may be associated with CCE 2 and CCE 3. The second TD CCE bundle may be associated with a second beam (e.g., TCI state 2). The first TD CCE bundle and the second TD CCE bundle may be associated with the same CORESET. The first beam may be associated with a first panel and the second beam may be associated with a second panel. Further, the first TD CCE bundle and the second TD CCE bundle may be separated by a beam switching gap, which may enable switching between the first beam and the second beam.

As indicated above, FIG. 9 is provided as an example. Other examples may differ from what is described with regard to FIG. 9.

In some aspects, TD CCEs or TD CCE bundles associated with different beams may be time division multiplexed. Explicit beam switching gaps may or may not be inserted between TD CCEs or TD CCE bundles from different beams. For example, a gap may not be needed when a CP is long enough to include a beam switching delay. In some aspects, TD CCEs or TD CCE bundles associated with different beams may be spatial division multiplexed. The TD CCEs or TD CCE bundles associated with the different beams may be transmitted at a same time based at least in part on spatial division multiplexing, and the TD CCEs or TD CCE bundles may be a same bandwidth or different bandwidths depending on a UE capability. In some aspects, TD CCEs or TD CCE bundles associated with different beams may be frequency division multiplexed, and the TD CCEs or TD CCE bundles may be a same bandwidth or different bandwidths depending on the UE capability. For frequency division multiplexing, guard bands may be inserted between TD CCEs. In some aspects, a separate channel estimate may be performed for each of the TD CCEs or TD CCE bundles from different beams.

Figure 10:
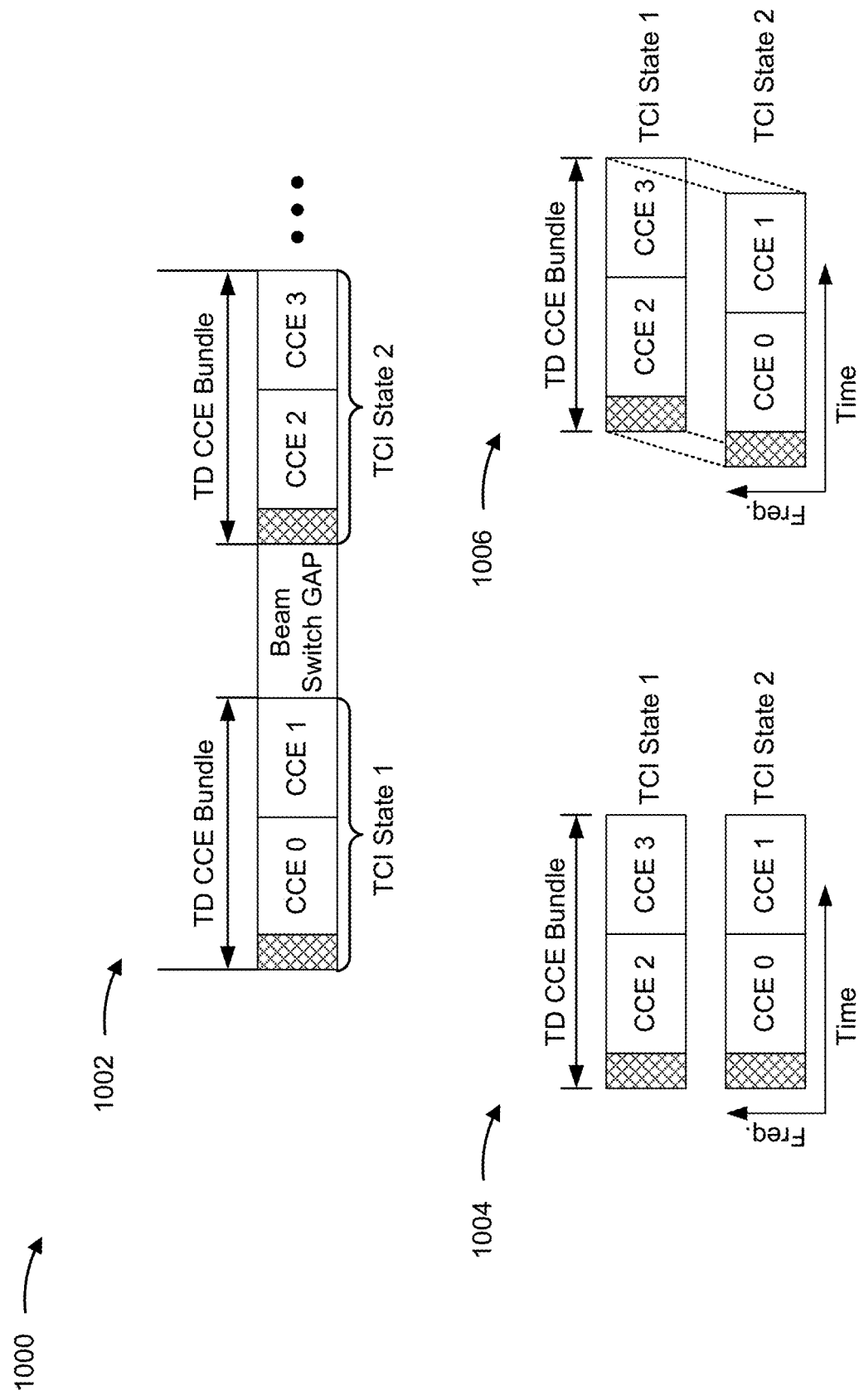
FIG. 10 is a diagram illustrating examples associated with TD CCEs or TD CCE bundles corresponding to different beams, in accordance with the present disclosure.

FIG. 10 is a diagram illustrating examples 1000 associated with TD CCEs or TD CCE bundles corresponding to different beams, in accordance with the present disclosure.

As shown by reference number 1002, TD CCE bundles associated with different beams may be time division multiplexed. For example, a first TD CCE bundle may be associated with a first beam (e.g., TCI state 1), and the first TD CCE bundle may include CCE 0 and CCE 1. A second first TD CCE bundle may be associated with a second beam (e.g., TCI state 2), and the second TD CCE bundle may include CCE 2 and CCE 3. The first beam and the second beam may be associated with one panel. The first TD CCE bundle may be time division multiplexed with the second TD CCE bundle, and the first TD CCE bundle and the second TD CCE bundle may be separated by a beam switching gap.

As shown by reference number 1004, TD CCE bundles associated with different beams may be frequency division multiplexed. For example, a first TD CCE bundle may be associated with a first beam (e.g., TCI state 1), and the first TD CCE bundle may include CCE 2 and CCE 3. A second first TD CCE bundle may be associated with a second beam (e.g., TCI state 2), and the second TD CCE bundle may include CCE 0 and CCE 1. The first beam and the second beam may be associated with two panels. The first TD CCE bundle may be frequency division multiplexed with the second TD CCE bundle, and the first TD CCE bundle and the second TD CCE bundle may be separated by a guard band.

As shown by reference number 1006, TD CCE bundles associated with different beams may be spatial division multiplexed. For example, a first TD CCE bundle may be associated with a first beam (e.g., TCI state 1), and the first TD CCE bundle may include CCE 2 and CCE 3. A second first TD CCE bundle may be associated with a second beam (e.g., TCI state 2), and the second TD CCE bundle may include CCE 0 and CCE 1. The first beam and the second beam may be associated with two panels. The first TD CCE bundle may be spatial division multiplexed with the second TD CCE bundle.

As indicated above, FIG. 10 is provided as an example. Other examples may differ from what is described with regard to FIG. 10.

A TD CCE design may be used for single carrier waveforms and for higher bands. A quantity of UEs that need to be multiplexed in a TD CORESET may change over time. A UE coverage may change over time, and aggregation levels for a certain PDCCH may also change based at least in part on the change to the UE coverage. For TD CORESETs, a DMRS and TD CCEs may be time multiplexed. Thus, a variable or dynamic quantity of TD CCEs may be allocated for a certain CORESET. A TD CORESET configuration may define the variable quantity of TD CCEs that are allocated for the certain CORESET. Further, since DMRS may be time division multiplexed and is front loaded, the DMRS may be used to indicate the TD CORESET configuration of the variable quantity of TD CCEs that are allocated for the certain CORESET.

In some aspects, a TD CORESET configuration may be changed dynamically. The TD CORESET configuration may indicate a quantity of available TD CCEs or TD CCE bundles. The TD CORESET configuration may indicate an aggregation level. The TD CORESET configuration may indicate an aggregation configuration. The TD CORESET configuration may indicate a beam diversity configuration. The TD CORESET configuration may indicate a configuration of a DMRS for TD CCEs (e.g., self-contained CCEs or a shared DMRS).

Figure 11:
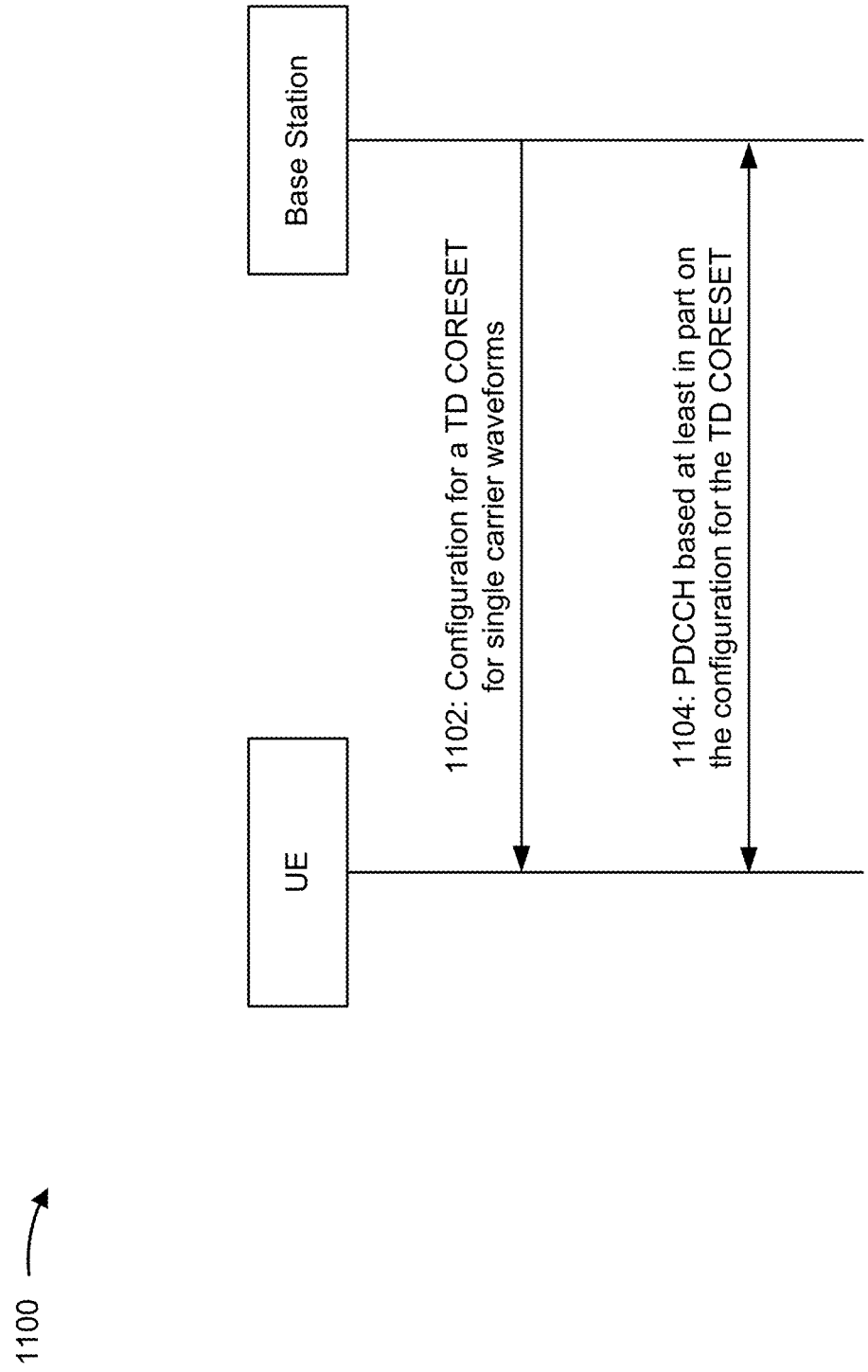
FIG. 11 is a diagram illustrating an example associated with configuring TD CORESETs for single carrier waveforms, in accordance with the present disclosure.

FIG. 11 is a diagram illustrating an example 1100 of configuring TD CORESETs for single carrier waveforms, in accordance with the present disclosure. As shown in FIG. 11, example 1100 includes communication between a UE (e.g., UE 120) and a base station (e.g., base station 110). In some aspects, the UE and the base station may be included in a wireless network such as wireless network 100.

As shown by reference number 1102, the UE may receive, from a base station, an indication of a configuration for a TD CORESET for single carrier waveforms that dynamically changes one or more parameters associated with the TD CORESET. In some aspects, the UE may receive the indication of the configuration for the TD CORESET in a DMRS associated with the TD CORESET. In some aspects, the UE may receive the indication of the configuration for the TD CORESET in downlink control information (DCI) that occurs prior in time in relation to the TD CORESET. In some aspects, the UE may receive the indication of the configuration for the TD CORESET in a medium access control control element (MAC-CE) that occurs prior in time in relation to the TD CORESET. In some aspects, the UE may receive an index that corresponds to the configuration for the TD CORESET from a list of pre-signaled TD CORESET configurations. In other words, the configuration for the TD CORESET may be included in the list of pre-signaled TD CORESET configurations, and the index received from the base station may indicate which configuration to use from the list of pre-signaled TD CORESET configurations.

In some aspects, the indication of the configuration for the TD CORESET may indicate a quantity of available TD CCEs to be associated with the TD CORESET or a quantity of available TD CCE bundles to be associated with the TD CORESET. In some aspects, the indication of the configuration for the TD CORESET may indicate an aggregation level to be associated with the TD CORESET. In some aspects, the indication of the configuration for the TD CORESET may indicate an aggregation configuration to be associated with the TD CORESET. In some aspects, the indication of the configuration for the TD CORESET may indicate a beam diversity configuration to be associated with the TD CORESET. In some aspects, the indication of the configuration for the TD CORESET may indicate a configuration of DMRSs for TD CCEs in the TD CORESET, where the TD CCEs may be self-contained CCEs with dedicated DMRSs or TD CCEs having a shared DMRS.

In some aspects, a first time associated with receiving the configuration for the TD CORESET and a second time associated with applying the configuration for the TD CORESET may be separated by a gap that satisfies a threshold. The gap may be based at least in part on a UE capability.

As shown by reference number 1104, the UE may receive, from the base station, a PDCCH based at least in part on the indication of the configuration for the TD CORESET. The TD CORESET may indicate TD resources that correspond to a location of PDCCH resources. The indication of the configuration for the TD CORESET (e.g., which may indicate the quantity of available TD CCEs or TD CCE bundles, aggregation level, aggregation configuration, beam diversity configuration, and/or DMRS configuration for TD CCEs) may enable the UE to decode the PDCCH received in PDCCH resources associated with the TD CORESET.

As indicated above, FIG. 11 is provided as an example. Other examples may differ from what is described with regard to FIG. 11.

Figure 12:
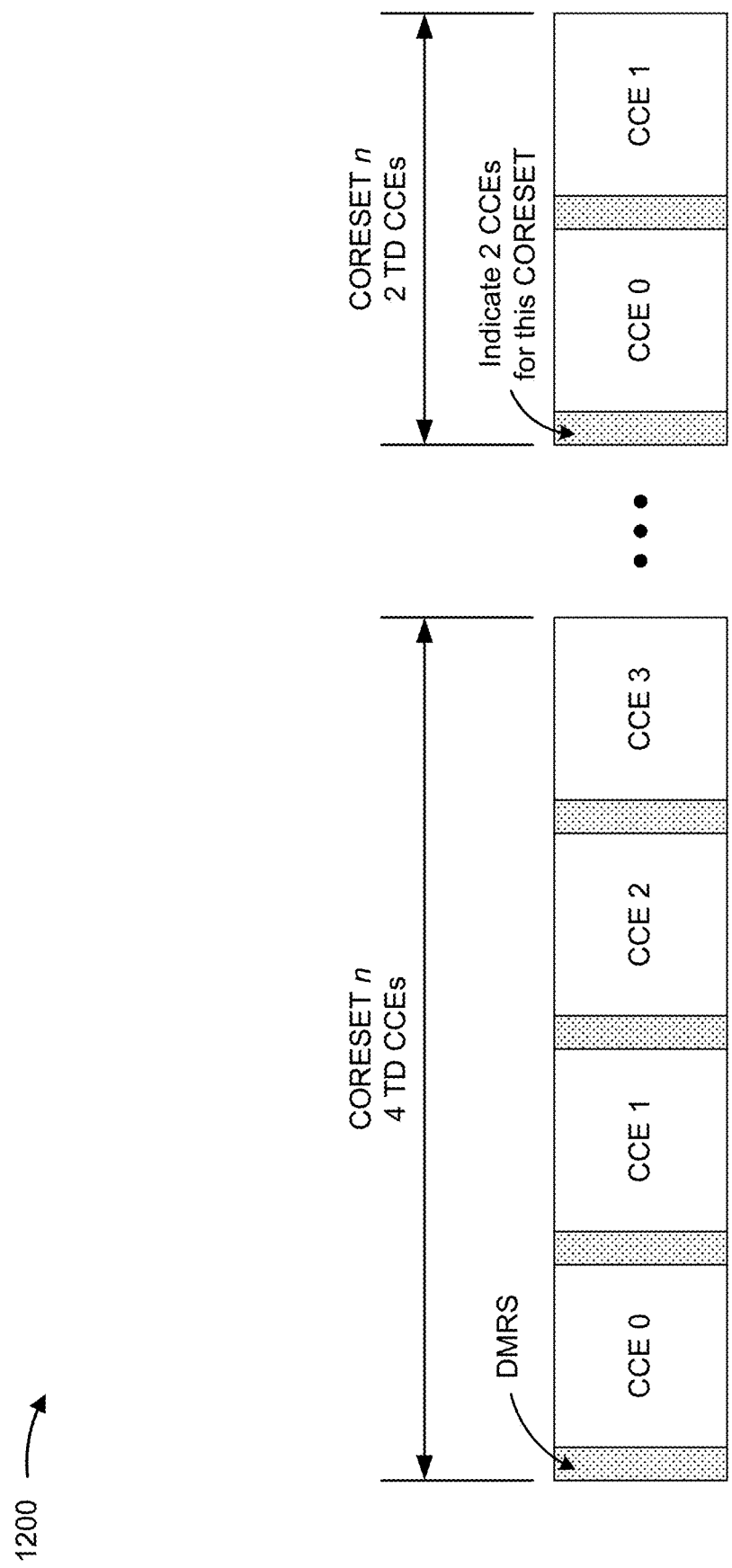
FIG. 12 is a diagram illustrating an example associated with dynamically changing a TD CORESET configuration, in accordance with the present disclosure.

FIG. 12 is a diagram illustrating an example 1200 associated with dynamically changing a TD CORESET configuration, in accordance with the present disclosure.

As shown in FIG. 12, a TD CORESET (e.g., TD CORESET n) may include four TD CCEs. The four TD CCEs may include CCE 0, CCE 1, CCE 2, and CCE 3, and each CCE may include a DMRS. Based at least in part on a dynamic change to the TD CORESET configuration associated with the TD CORESET, which may occur at a later point in time, the TD CORESET may be changed to include two TD CCEs. The two CCEs may include CCE 0 and CCE 1. Further, CCE 0 may include a DMRS that indicates that the TD CORESET includes two TD CCEs.

As indicated above, FIG. 12 is provided as an example. Other examples may differ from what is described with regard to FIG. 12.

In some aspects, a base station may indicate, to a UE, a TD CORESET configuration that dynamically changes one or more features of a TD CORESET (e.g., a quantity of available TD CCEs or TD CCE bundles, an aggregation level, an aggregation configuration, a beam diversity configuration, and/or a configuration of DMRS for the TD CCEs). The base station may indicate the TD CORESET configuration to the UE in DMRS of the TD CORESET. The base station may indicate the TD CORESET configuration to the UE as part of the DMRS (e.g., a sequence, or a quantity of TD samples). In some aspects, the base station may indicate the TD CORESET configuration to the UE as part of a previous downlink control information (DCI). For example, the base station may transmit the DCI prior to the TD CORESET. In some aspects, the base station may indicate the TD CORESET configuration to the UE as part of a previous MAC-CE. For example, the base station may transmit the MAC-CE prior to the TD CORESET.

In some aspects, the base station may dynamically transmit the TD CORESET configuration to the UE. In some aspects, the base station may dynamically transmit an index to the UE, where the index may indicate a TD CORESET configuration from a list of pre-signaled TD CORESET configuration. In some aspects, a gap may occur between a signaling of the TD CORESET configuration (e.g., in a DMRS) and an application of the TD CORESET configuration. The gap may occur based at least in part on a preconfigured rule and/or a UE capability.

Figure 13:
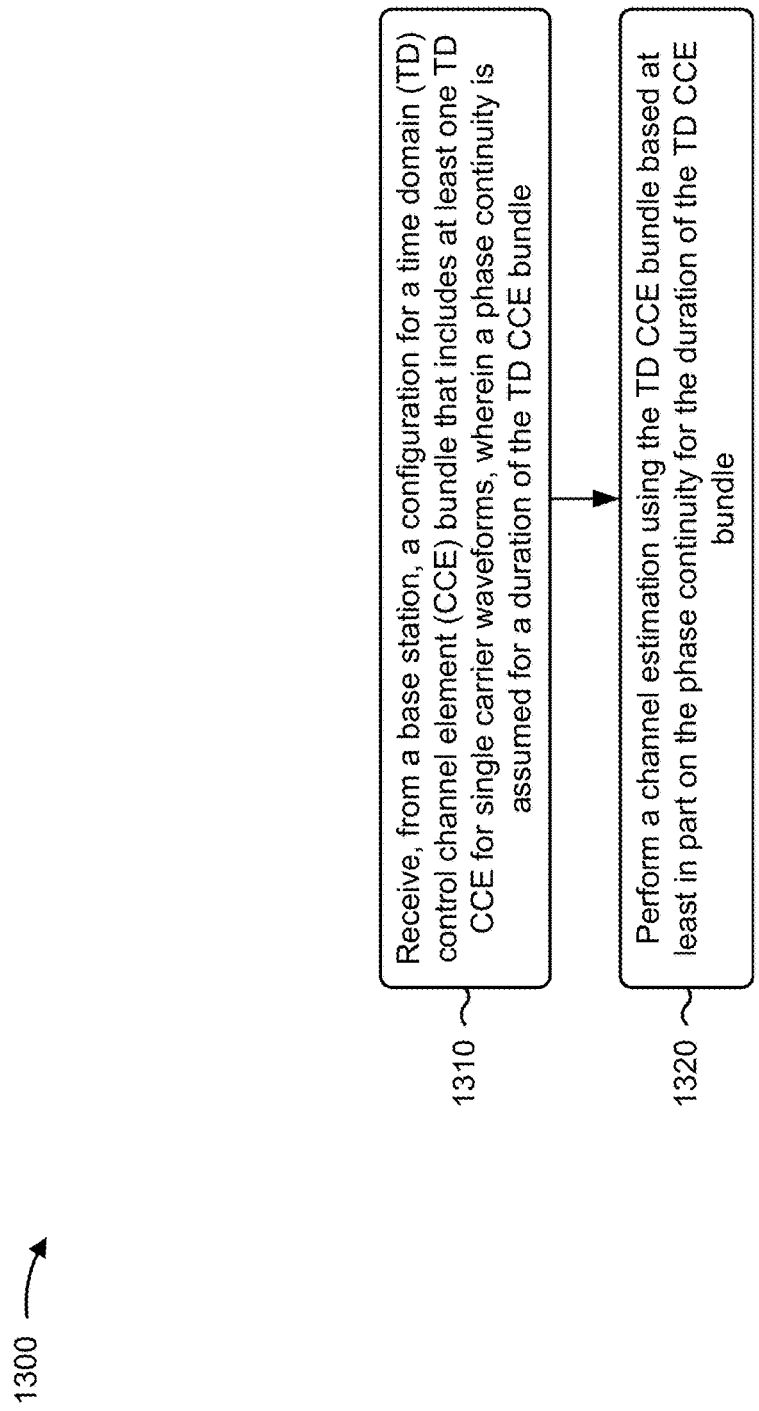
FIGS. 13-14 are diagrams illustrating example processes associated with configuring TD CCE bundles for single carrier waveforms, in accordance with the present disclosure.

FIG. 13 is a diagram illustrating an example process 1300 performed, for example, by a UE, in accordance with the present disclosure. Example process 1300 is an example where the UE (e.g., UE 120) performs operations associated with configuring TD CCE bundles for single carrier waveforms.

As shown in FIG. 13, in some aspects, process 1300 may include receiving, from a base station, a configuration for a TD CCE bundle that includes at least one TD CCE for single carrier waveforms, wherein a phase continuity is assumed for a duration of the TD CCE bundle (block 1310). For example, the UE (e.g., using reception component 1702, depicted in FIG. 17) may receive, from a base station, a configuration for a TD CCE bundle that includes at least one TD CCE for single carrier waveforms, wherein a phase continuity is assumed for a duration of the TD CCE bundle, as described above.

As further shown in FIG. 13, in some aspects, process 1300 may include performing a channel estimation using the TD CCE bundle based at least in part on the phase continuity for the duration of the TD CCE bundle (block 1320). For example, the UE (e.g., using performance component 1708, depicted in FIG. 17) may perform a channel estimation using the TD CCE bundle based at least in part on the phase continuity for the duration of the TD CCE bundle, as described above.

Process 1300 may include additional aspects, such as any single aspect or any combination of aspects described below and/or in connection with one or more other processes described elsewhere herein.

In a first aspect, the TD CCE bundle spans one or more symbols, and the TD CCE bundle includes one or more DMRSs.

In a second aspect, alone or in combination with the first aspect, the TD CCE bundle is contiguous in time, or the TD CCE bundle is non-contiguous in time, and the TD CCE bundle includes TD CCEs that are separated by a symbol or a CCE associated with another UE.

In a third aspect, alone or in combination with one or more of the first and second aspects, process 1300 includes transmitting, to the base station, an indication of a UE capability of a TD CCE phase continuity of a defined duration.

In a fourth aspect, alone or in combination with one or more of the first through third aspects, the configuration for the TD CCE bundle is associated with one or more CORESETs.

In a fifth aspect, alone or in combination with one or more of the first through fourth aspects, the configuration for the TD CCE bundle indicates one or more of a quantity associated with the at least one TD CCE in the TD CCE bundle, a distribution of the TD CCE bundle that indicates whether gaps are present in the TD CCE bundle, or a quantity and locations of DMRSs within the TD CCE bundle.

In a sixth aspect, alone or in combination with one or more of the first through fifth aspects, the configuration is a first configuration, and process 1300 includes receiving, from the base station, a second configuration for a TD aggregation of one or more TD control elements, wherein a TD control element of the one or more TD control elements is the TD CCE or the TD CCE bundle.

In a seventh aspect, alone or in combination with one or more of the first through sixth aspects, the channel estimation is associated with a plurality of TD-aggregated TD CCEs, or different channel estimations are associated with different groups within the plurality of TD-aggregated TD CCEs, or the channel estimation is per TD CCE bundle associated with the TD aggregation.

In an eighth aspect, alone or in combination with one or more of the first through seventh aspects, the TD aggregation is associated with contiguous TD control elements, the TD aggregation is associated with non-contiguous TD control elements, a same channel estimation is associated with the non-contiguous TD control elements or different channel estimations are associated with different non-contiguous TD control elements, and a same DMRS is shared when the same channel estimation is used, or the TD aggregation is based at least in part on a pattern of contiguous TD control elements and non-contiguous TD control elements.

In a ninth aspect, alone or in combination with one or more of the first through eighth aspects, TD CCE bundles associated with the TD aggregation are associated with a same bundle size, or TD CCE bundles associated with the TD aggregation are associated with different bundle sizes.

In a tenth aspect, alone or in combination with one or more of the first through ninth aspects, TD control elements associated with the TD aggregation are associated with a same TD CORESET or different TD CORESETs, or TD control elements associated with the TD aggregation are associated with a same TD symbol or different TD symbols.

In an eleventh aspect, alone or in combination with one or more of the first through tenth aspects, multiple TD CCEs or multiple TD CCE bundles are associated with different beams and different TCI states, wherein the multiple TD CCEs or the multiple TD CCE bundles are associated with a same CORESET or different CORESETs, a same aggregated TD CCE or different aggregated TD CCEs, or a same TD symbol or different TD symbols.

In a twelfth aspect, alone or in combination with one or more of the first through eleventh aspects, the multiple TD CCEs or the multiple TD CCE bundles associated with the different beams and the different TCI states are time division multiplexed, wherein a beam switching gap is inserted between TD CCEs or TD CCE bundles associated with the different beams when a cyclic prefix length is not sufficient to include a beam switching delay.

In a thirteenth aspect, alone or in combination with one or more of the first through twelfth aspects, the multiple TD CCEs or the multiple TD CCE bundles associated with the different beams and the different TCI states are spatial division multiplexed, wherein TD CCEs or TD CCE bundles use a same bandwidth or different bandwidths based at least in part on a UE capability.

In a fourteenth aspect, alone or in combination with one or more of the first through thirteenth aspects, the multiple TD CCEs or the multiple TD CCE bundles associated with the different beams and the different TCI states are frequency division multiplexed, wherein TD CCEs or TD CCE bundles use a same bandwidth or different bandwidths based at least in part on a UE capability, and wherein a guard band is inserted between the TD CCEs or the TD CCE bundles.

In a fifteenth aspect, alone or in combination with one or more of the first through fourteenth aspects, the multiple TD CCEs or the multiple TD CCE bundles associated with the different beams are associated with separate channel estimations.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
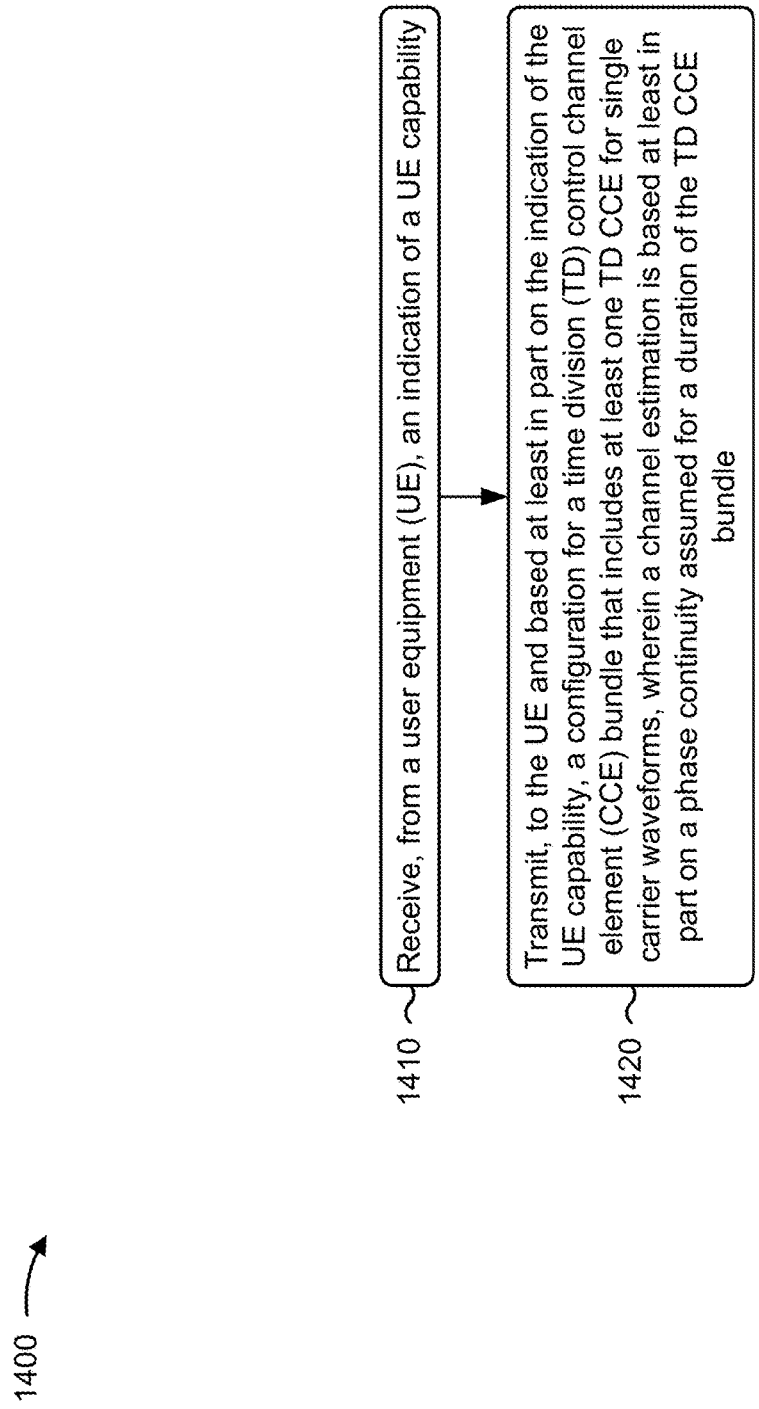

FIG. 14 is a diagram illustrating an example process 1400 performed, for example, by a base station, in accordance with the present disclosure. Example process 1400 is an example where the base station (e.g., base station 110) performs operations associated with configuring TD CCE bundles for single carrier waveforms.

As shown in FIG. 14, in some aspects, process 1400 may include receiving, from a UE, an indication of a UE capability (block 1410). For example, the base station (e.g., using reception component 1802, depicted in FIG. 18) may receive, from a UE, an indication of a UE capability, as described above.

As further shown in FIG. 14, in some aspects, process 1400 may include transmitting, to the UE and based at least in part on the indication of the UE capability, a configuration for a TD CCE bundle that includes at least one TD CCE for single carrier waveforms, wherein a channel estimation is based at least in part on a phase continuity assumed for a duration of the TD CCE bundle (block 1420). For example, the base station (e.g., using transmission component 1804, depicted in FIG. 18) may transmit, to the UE and based at least in part on the indication of the UE capability, a configuration for a TD CCE bundle that includes at least one TD CCE for single carrier waveforms, wherein a channel estimation is based at least in part on a phase continuity assumed for a duration of the TD CCE bundle, as described above.

Process 1400 may include additional aspects, such as any single aspect or any combination of aspects described below and/or in connection with one or more other processes described elsewhere herein.

In a first aspect, the configuration is a first configuration, and process 1400 includes transmitting, to the UE, a second configuration for a TD aggregation of one or more TD control elements, wherein a TD control element of the one or more TD control elements is the TD CCE or the TD CCE bundle.

In a second aspect, alone or in combination with the first aspect, the TD CCE bundle spans one or more symbols, and the TD CCE bundle includes one or more DMRSs.

In a third aspect, alone or in combination with one or more of the first and second aspects, the TD CCE bundle is contiguous in time, or the TD CCE bundle is non-contiguous in time, and the TD CCE bundle includes TD CCEs that are separated by a symbol or a CCE associated with another UE.

In a fourth aspect, alone or in combination with one or more of the first through third aspects, the configuration for the TD CCE bundle indicates one or more of a quantity associated with the at least one TD CCE in the TD CCE bundle, a distribution of the TD CCE bundle that indicates whether gaps are present in the TD CCE bundle, or a quantity and locations of DMRSs within the TD CCE bundle.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
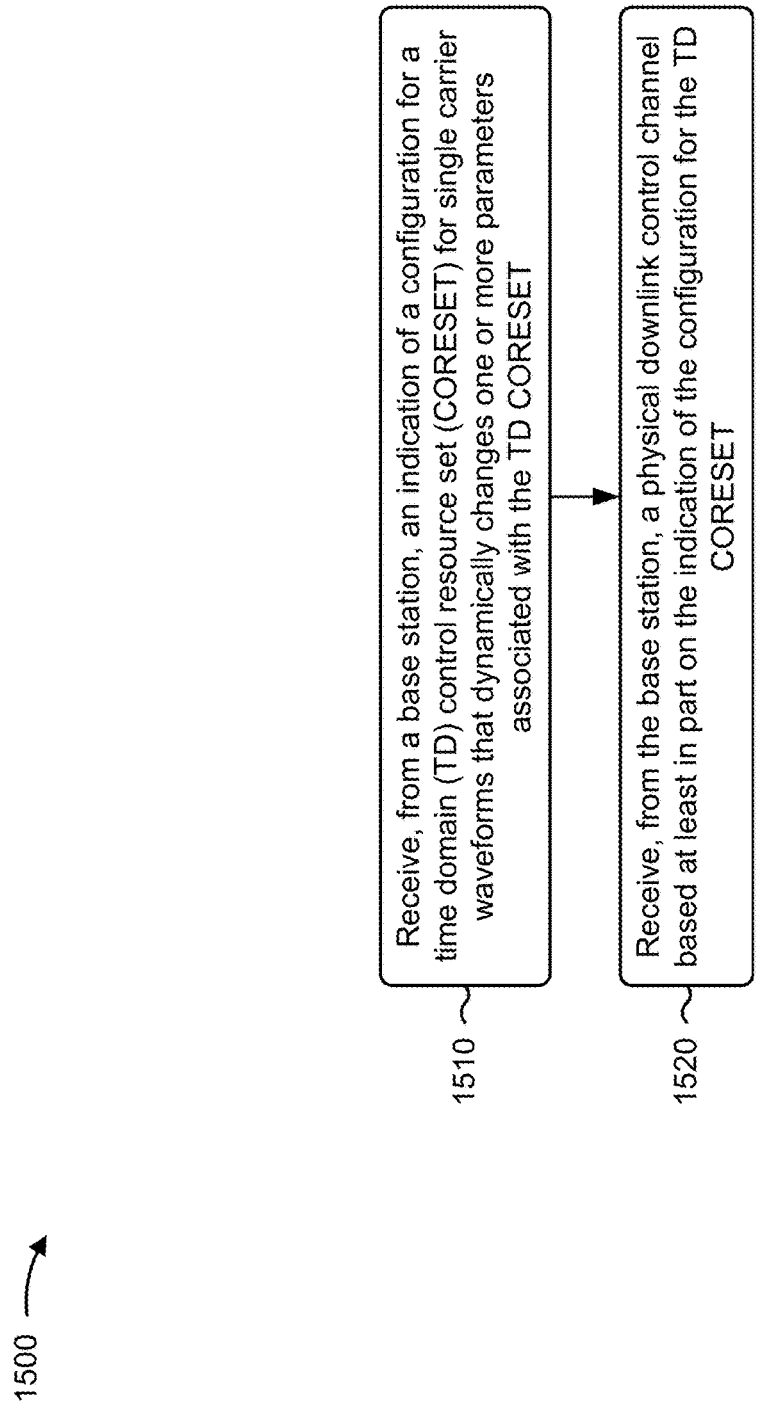
FIGS. 15-16 are diagrams illustrating example processes associated with configuring TD CORESETs for single carrier waveforms, in accordance with the present disclosure.

FIG. 15 is a diagram illustrating an example process 1500 performed, for example, by a UE, in accordance with the present disclosure. Example process 1500 is an example where the UE (e.g., UE 120) performs operations associated with configuring TD CORESETs for single carrier waveforms.

As shown in FIG. 15, in some aspects, process 1500 may include receiving, from a base station, an indication of a configuration for a TD CORESET for single carrier waveforms that dynamically changes one or more parameters associated with the TD CORESET (block 1510). For example, the UE (e.g., using reception component 1702, depicted in FIG. 17) may receive, from a base station, an indication of a configuration for a TD CORESET for single carrier waveforms that dynamically changes one or more parameters associated with the TD CORESET, as described above.

As further shown in FIG. 15, in some aspects, process 1500 may include receiving, from the base station, a PDCCH based at least in part on the indication of the configuration for the TD CORESET (block 1520). For example, the UE (e.g., using reception component 1702, depicted in FIG. 17) may receive, from the base station, a PDCCH based at least in part on the indication of the configuration for the TD CORESET, as described above.

Process 1500 may include additional aspects, such as any single aspect or any combination of aspects described below and/or in connection with one or more other processes described elsewhere herein.

In a first aspect, the indication of the configuration for the TD CORESET indicates a quantity of available TD CCEs to be associated with the TD CORESET or a quantity of available TD CCE bundles to be associated with the TD CORESET.

In a second aspect, alone or in combination with the first aspect, the indication of the configuration for the TD CORESET indicates an aggregation level to be associated with the TD CORESET.

In a third aspect, alone or in combination with one or more of the first and second aspects, the indication of the configuration for the TD CORESET indicates an aggregation configuration to be associated with the TD CORESET.

In a fourth aspect, alone or in combination with one or more of the first through third aspects, the indication of the configuration for the TD CORESET indicates a beam diversity configuration to be associated with the TD CORESET.

In a fifth aspect, alone or in combination with one or more of the first through fourth aspects, the indication of the configuration for the TD CORESET indicates a configuration of DMRSs for TD CCEs in the TD CORESET, wherein the TD CCEs may be self-contained CCEs with dedicated DMRSs or TD CCEs having a shared DMRS.

In a sixth aspect, alone or in combination with one or more of the first through fifth aspects, process 1500 includes receiving the configuration in a demodulation reference signal associated with the TD CORESET.

In a seventh aspect, alone or in combination with one or more of the first through sixth aspects, process 1500 includes receiving the indication of the configuration in DCI that occurs prior in time in relation to the TD CORESET.

In an eighth aspect, alone or in combination with one or more of the first through seventh aspects, process 1500 includes receiving the indication of the configuration in a MAC-CE that occurs prior in time in relation to the TD CORESET.

In a ninth aspect, alone or in combination with one or more of the first through eighth aspects, process 1500 includes receiving an index that corresponds to the configuration for the TD CORESET from a list of pre-signaled TD CORESET configurations.

In a tenth aspect, alone or in combination with one or more of the first through ninth aspects, a first time associated with receiving the configuration for the TD CORESET and a second time associated with applying the configuration for the TD CORESET are separated by a gap that satisfies a threshold based at least in part on a UE capability.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
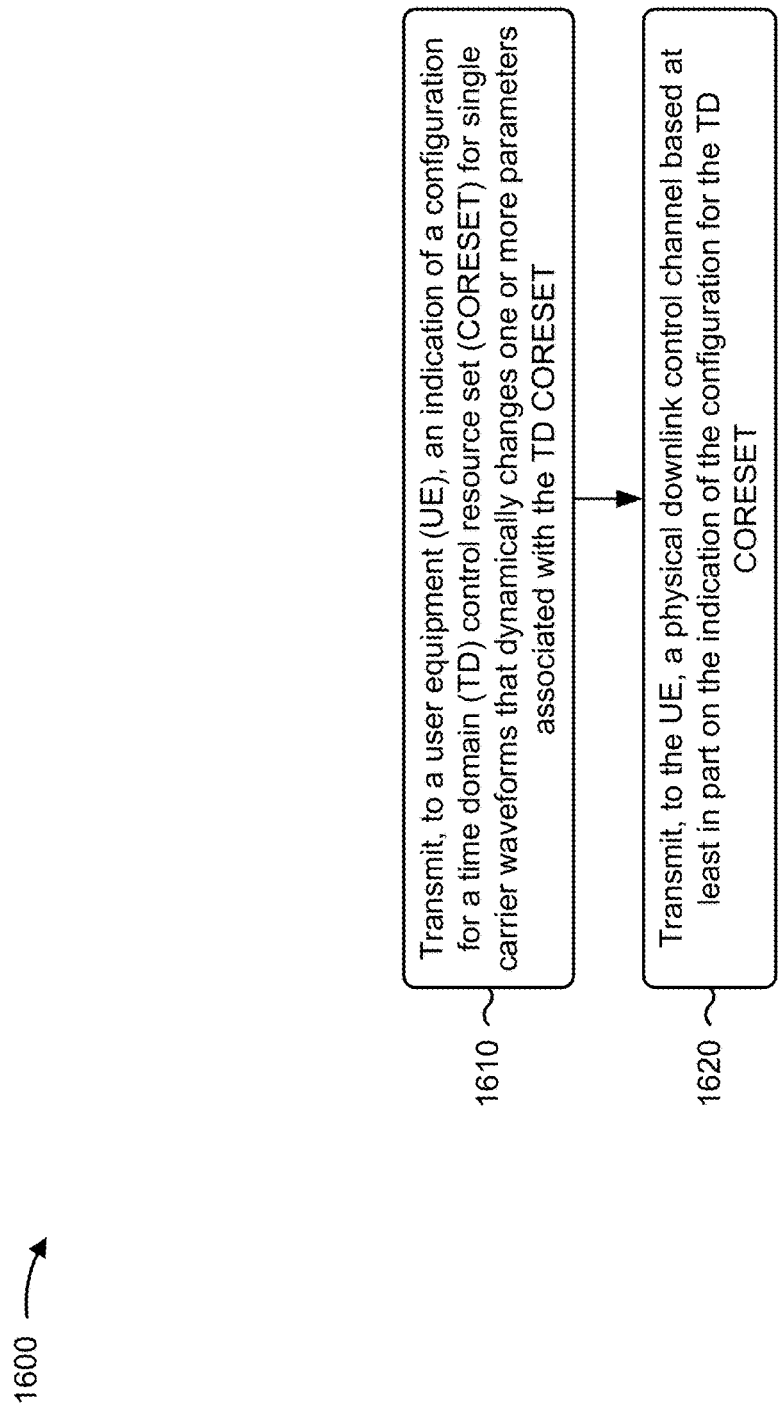

FIG. 16 is a diagram illustrating an example process 1600 performed, for example, by a base station, in accordance with the present disclosure. Example process 1600 is an example where the base station (e.g., base station 110) performs operations associated with configuring TD CORESETs for single carrier waveforms.

As shown in FIG. 16, in some aspects, process 1600 may include transmitting, to a UE, an indication of a configuration for a TD CORESET for single carrier waveforms that dynamically changes one or more parameters associated with the TD CORESET (block 1610). For example, the base station (e.g., using transmission component 1804, depicted in FIG. 18) may transmit, to a UE, an indication of a configuration for a TD CORESET for single carrier waveforms that dynamically changes one or more parameters associated with the TD CORESET, as described above.

As further shown in FIG. 16, in some aspects, process 1600 may include transmitting, to the UE, a PDCCH based at least in part on the indication of the configuration for the TD CORESET (block 1620). For example, the base station (e.g., using transmission component 1804, depicted in FIG. 18) may transmit, to the UE, a PDCCH based at least in part on the indication of the configuration for the TD CORESET, as described above.

Process 1600 may include additional aspects, such as any single aspect or any combination of aspects described below and/or in connection with one or more other processes described elsewhere herein.

In a first aspect, process 1600 includes transmitting the indication of the configuration in a DMRS associated with the TD CORESET.

In a second aspect, alone or in combination with the first aspect, process 1600 includes transmitting the indication of the configuration in DCI that occurs prior in time in relation to the TD CORESET.

In a third aspect, alone or in combination with one or more of the first and second aspects, process 1600 includes transmitting the indication of the configuration in a MAC-CE that occurs prior in time in relation to the TD CORESET.

In a fourth aspect, alone or in combination with one or more of the first through third aspects, process 1600 includes transmitting an index that corresponds to the configuration for the TD CORESET from a list of pre-signaled TD CORESET configurations.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
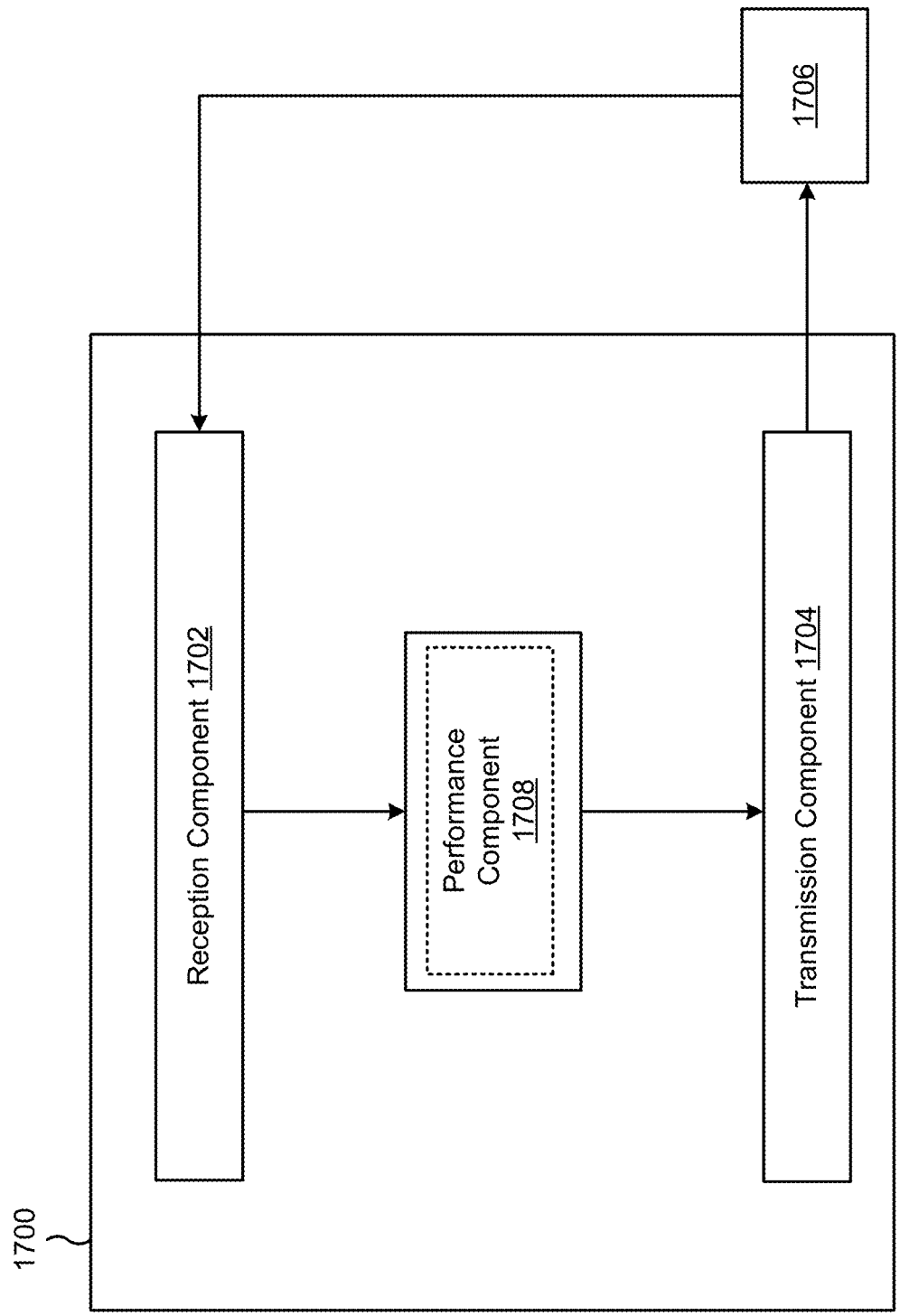
FIGS. 17-18 are block diagrams of example apparatuses for wireless communication, in accordance with the present disclosure.

FIG. 17 is a block diagram of an example apparatus 1700 for wireless communication. The apparatus 1700 may be a UE, or a UE may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1700 may include a performance component 1708, among other examples.

In some aspects, the apparatus 1700 may be configured to perform one or more operations described herein in connection with FIGS. 4-12. Additionally, or alternatively, the apparatus 1700 may be configured to perform one or more processes described herein, such as process 1300 of FIG. 13, process 1500 of FIG. 15, or a combination thereof. In some aspects, the apparatus 1700 and/or one or more components shown in FIG. 17 may include one or more components of the UE described above in connection with FIG. 2. Additionally, or alternatively, one or more components shown in FIG. 17 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1706. In some aspects, the reception component 1702 may include one or more antennas, a demodulator, a MIMO detector, a receive processor, a controller/processor, a memory, or a combination thereof, of the UE described above in connection with FIG. 2.

The transmission component 1704 may transmit communications, such as reference signals, control information, data communications, or a combination thereof, to the apparatus 1706. In some aspects, one or more other components of the apparatus 1706 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modulator, a transmit MIMO processor, a transmit processor, a controller/processor, a memory, or a combination thereof, of the UE described above in connection with FIG. 2. In some aspects, the transmission component 1704 may be co-located with the reception component 1702 in a transceiver.

The reception component 1702 may receive, from a base station, a configuration for a TD CCE bundle that includes at least one TD CCE for single carrier waveforms, wherein a phase continuity is assumed for a duration of the TD CCE bundle. The performance component 1708 may perform a channel estimation using the TD CCE bundle based at least in part on the phase continuity for the duration of the TD CCE bundle.

The reception component 1702 may receive, from a base station, an indication of a configuration for a TD CORESET for single carrier waveforms that dynamically changes one or more parameters associated with the TD CORESET. The reception component 1702 may receive, from the base station, a PDCCH based at least in part on the indication of the configuration for the TD CORESET.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

Figure 18:
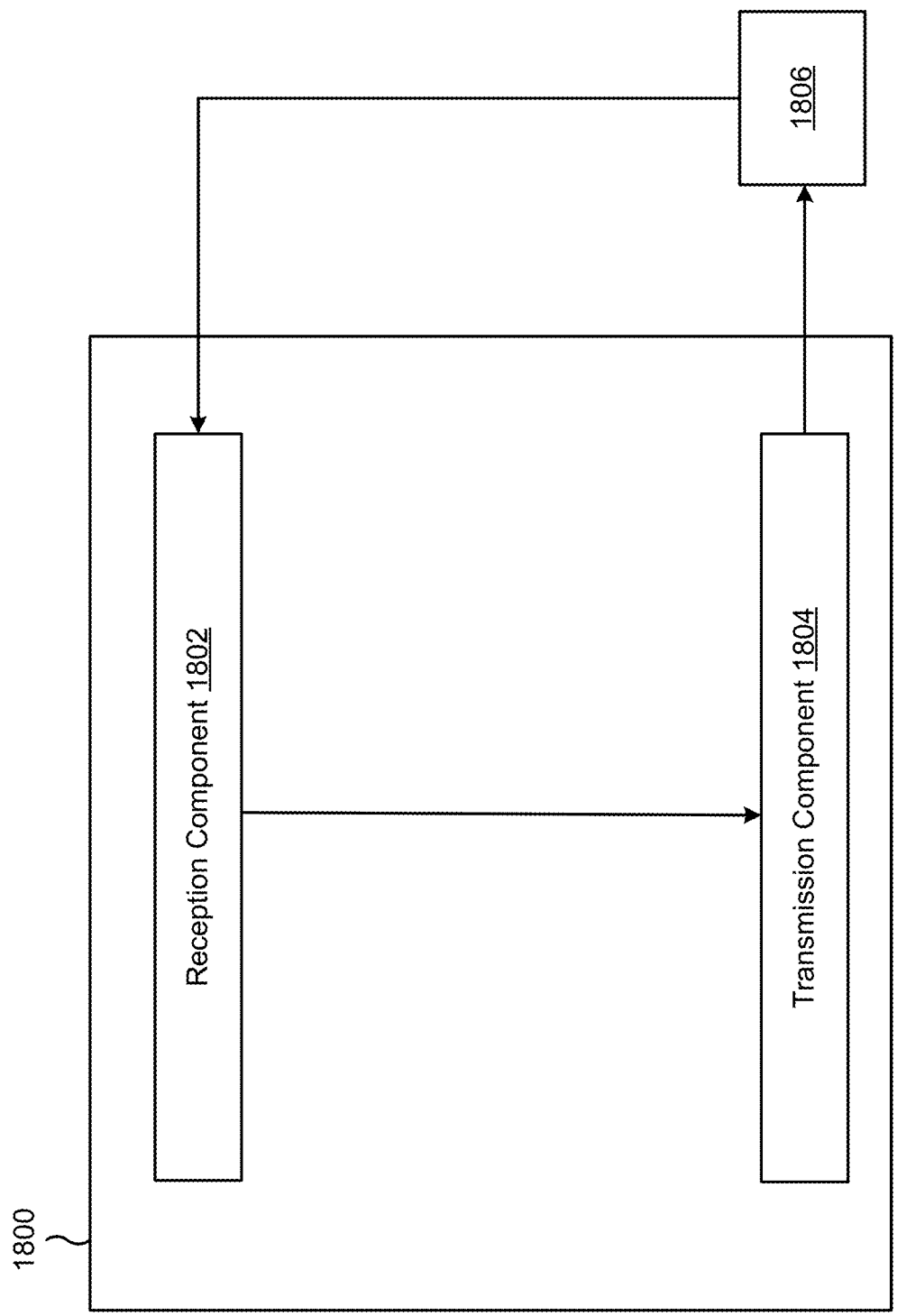

FIG. 18 is a block diagram of an example apparatus 1800 for wireless communication. The apparatus 1800 may be a base station, or a base station may include the apparatus 1800. In some aspects, the apparatus 1800 includes a reception component 1802 and a transmission component 1804, which may be in communication with one another (for example, via one or more buses and/or one or more other components). As shown, the apparatus 1800 may communicate with another apparatus 1806 (such as a UE, a base station, or another wireless communication device) using the reception component 1802 and the transmission component 1804.

In some aspects, the apparatus 1800 may be configured to perform one or more operations described herein in connection with FIGS. 4-12. Additionally, or alternatively, the apparatus 1800 may be configured to perform one or more processes described herein, such as process 1400 of FIG. 14, process 1600 of FIG. 16, or a combination thereof. In some aspects, the apparatus 1800 and/or one or more components shown in FIG. 18 may include one or more components of the base station described above in connection with FIG. 2. Additionally, or alternatively, one or more components shown in FIG. 18 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1806. In some aspects, the reception component 1802 may include one or more antennas, a demodulator, a MIMO detector, a receive processor, a controller/processor, a memory, or a combination thereof, of the base station described above in connection with FIG. 2.

The transmission component 1804 may transmit communications, such as reference signals, control information, data communications, or a combination thereof, to the apparatus 1806. In some aspects, one or more other components of the apparatus 1806 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modulator, a transmit MIMO processor, a transmit processor, a controller/processor, a memory, or a combination thereof, of the base station described above in connection with FIG. 2. In some aspects, the transmission component 1804 may be co-located with the reception component 1802 in a transceiver.

The reception component 1802 may receive, from a UE, an indication of a UE capability. The transmission component 1804 may transmit, to the UE and based at least in part on the indication of the UE capability, a configuration for a TD CCE bundle that includes at least one TD CCE for single carrier waveforms, wherein a channel estimation is based at least in part on a phase continuity assumed for a duration of the TD CCE bundle.

The transmission component 1804 may transmit, to a UE, an indication of a configuration for a TD CORESET for single carrier waveforms that dynamically changes one or more parameters associated with the TD CORESET. The transmission component 1804 may transmit, to the UE, a PDCCH based at least in part on the indication of the configuration for the TD CORESET.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

The following provides an overview of some Aspects of the present disclosure:

Aspect 1: A method of wireless communication performed by a user equipment (UE), comprising: receiving, from a base station, a configuration for a time domain (TD) control channel element (CCE) bundle that includes at least one TD CCE for single carrier waveforms, wherein a phase continuity is assumed for a duration of the TD CCE bundle; and performing a channel estimation using the TD CCE bundle based at least in part on the phase continuity for the duration of the TD CCE bundle.

Aspect 2: The method of Aspect 1, wherein the TD CCE bundle spans one or more symbols, and wherein the TD CCE bundle includes one or more demodulation reference signals.

Aspect 3: The method of Aspect 1, wherein: the TD CCE bundle is contiguous in time; or the TD CCE bundle is non-contiguous in time, and wherein the TD CCE bundle includes TD CCEs that are separated by a symbol or a CCE associated with another UE.

Aspect 4: The method of any of Aspects 1 through 3, further comprising: transmitting, to the base station, an indication of a UE capability of a TD CCE phase continuity of a defined duration.

Aspect 5: The method of any of Aspects 1 through 4, wherein the configuration for the TD CCE bundle is associated with one or more control resource sets.

Aspect 6: The method of any of Aspects 1 through 5, wherein the configuration for the TD CCE bundle indicates one or more of: a quantity associated with the at least one TD CCE in the TD CCE bundle, a distribution of the TD CCE bundle that indicates whether gaps are present in the TD CCE bundle, or a quantity and locations of demodulation reference signals within the TD CCE bundle.

Aspect 7: The method of any of Aspects 1 through 6, wherein the configuration is a first configuration, and further comprising: receiving, from the base station, a second configuration for a TD aggregation of one or more TD control elements, wherein a TD control element of the one or more TD control elements is the TD CCE or the TD CCE bundle.

Aspect 8: The method of Aspect 7, wherein: the channel estimation is associated with a plurality of TD-aggregated TD CCEs, or different channel estimations are associated with different groups within the plurality of TD-aggregated TD CCEs; or the channel estimation is per TD CCE bundle associated with the TD aggregation.

Aspect 9: The method of Aspect 7, wherein: the TD aggregation is associated with contiguous TD control elements; the TD aggregation is associated with non-contiguous TD control elements, and wherein a same channel estimation is associated with the non-contiguous TD control elements or different channel estimations are associated with different non-contiguous TD control elements, and wherein a same demodulation reference signal is shared when the same channel estimation is used; or the TD aggregation is based at least in part on a pattern of contiguous TD control elements and non-contiguous TD control elements.

Aspect 10: The method of Aspect 7, wherein: TD CCE bundles associated with the TD aggregation are associated with a same bundle size; or TD CCE bundles associated with the TD aggregation are associated with different bundle sizes.

Aspect 11: The method of Aspect 7, wherein: TD control elements associated with the TD aggregation are associated with a same TD control resource set (CORESET) or different TD CORESETs; or TD control elements associated with the TD aggregation are associated with a same TD symbol or different TD symbols.

Aspect 12: The method of any of Aspects 1 through 11, wherein multiple TD CCEs or multiple TD CCE bundles are associated with different beams and different transmission configuration indicator (TCI) states, wherein the multiple TD CCEs or the multiple TD CCE bundles are associated with a same control resource set (CORESET) or different CORESETs, a same aggregated TD CCE or different aggregated TD CCEs, or a same TD symbol or different TD symbols.

Aspect 13: The method of Aspect 12, wherein the multiple TD CCEs or the multiple TD CCE bundles associated with the different beams and the different TCI states are time division multiplexed, wherein a beam switching gap is inserted between TD CCEs or TD CCE bundles associated with the different beams when a cyclic prefix length is not sufficient to include a beam switching delay.

Aspect 14: The method of Aspect 12, wherein the multiple TD CCEs or the multiple TD CCE bundles associated with the different beams and the different TCI states are spatial division multiplexed, wherein TD CCEs or TD CCE bundles use a same bandwidth or different bandwidths based at least in part on a UE capability.

Aspect 15: The method of Aspect 12, wherein the multiple TD CCEs or the multiple TD CCE bundles associated with the different beams and the different TCI states are frequency division multiplexed, wherein TD CCEs or TD CCE bundles use a same bandwidth or different bandwidths based at least in part on a UE capability, and wherein a guard band is inserted between the TD CCEs or the TD CCE bundles.

Aspect 16: The method of Aspect 12, wherein the multiple TD CCEs or the multiple TD CCE bundles associated with the different beams are associated with separate channel estimations.

Aspect 17: A method of wireless communication performed by a base station, comprising: receiving, from a user equipment (UE), an indication of a UE capability; and transmitting, to the UE and based at least in part on the indication of the UE capability, a configuration for a time division (TD) control channel element (CCE) bundle that includes at least one TD CCE for single carrier waveforms, wherein a channel estimation is based at least in part on a phase continuity assumed for a duration of the TD CCE bundle.

Aspect 18: The method of Aspect 17, wherein the configuration is a first configuration, and further comprising: transmitting, to the UE, a second configuration for a TD aggregation of one or more TD control elements, wherein a TD control element of the one or more TD control elements is the TD CCE or the TD CCE bundle.

Aspect 19: The method of any of Aspects 17 through 18, wherein the TD CCE bundle spans one or more symbols, and wherein the TD CCE bundle includes one or more demodulation reference signals.

Aspect 20: The method of any of Aspects 17 through 19, wherein: the TD CCE bundle is contiguous in time; or the TD CCE bundle is non-contiguous in time, and wherein the TD CCE bundle includes TD CCEs that are separated by a symbol or a CCE associated with another UE.

Aspect 21: The method of any of Aspects 17 through 20, wherein the configuration for the TD CCE bundle indicates one or more of: a quantity associated with the at least one TD CCE in the TD CCE bundle, a distribution of the TD CCE bundle that indicates whether gaps are present in the TD CCE bundle, or a quantity and locations of demodulation reference signals within the TD CCE bundle.

Aspect 22: A method of wireless communication performed by a user equipment (UE), comprising: receiving, from a base station, an indication of a configuration for a time domain (TD) control resource set (CORESET) for single carrier waveforms that dynamically changes one or more parameters associated with the TD CORESET; and receiving, from the base station, a physical downlink control channel based at least in part on the indication of the configuration for the TD CORESET.

Aspect 23: The method of Aspect 22, wherein the indication of the configuration for the TD CORESET indicates a quantity of available TD control channel elements (CCEs) to be associated with the TD CORESET or a quantity of available TD CCE bundles to be associated with the TD CORESET.

Aspect 24: The method of any of Aspects 22 through 23, wherein the indication of the configuration for the TD CORESET indicates an aggregation level to be associated with the TD CORESET.

Aspect 25: The method of any of Aspects 22 through 24, wherein the indication of the configuration for the TD CORESET indicates an aggregation configuration to be associated with the TD CORESET.

Aspect 26: The method of any of Aspects 22 through 25, wherein the indication of the configuration for the TD CORESET indicates a beam diversity configuration to be associated with the TD CORESET.

Aspect 27: The method of any of Aspects 22 through 26, wherein the indication of the configuration for the TD CORESET indicates a configuration of demodulation reference signals (DMRSs) for TD control channel elements (CCEs) in the TD CORESET, wherein the TD CCEs may be self-contained CCEs with dedicated DMRSs or TD CCEs having a shared DMRS.

Aspect 28: The method of any of Aspects 22 through 27, wherein receiving the indication of the configuration for the TD CORESET comprises receiving the configuration in a demodulation reference signal associated with the TD CORESET.

Aspect 29: The method of any of Aspects 22 through 28, wherein receiving the indication of the configuration for the TD CORESET comprises receiving the indication of the configuration in downlink control information that occurs prior in time in relation to the TD CORESET.

Aspect 30: The method of any of Aspects 22 through 29, wherein receiving the indication of the configuration for the TD CORESET comprises receiving the indication of the configuration in a medium access control control element that occurs prior in time in relation to the TD CORESET.

Aspect 31: The method of any of Aspects 22 through 30, wherein receiving the indication of the configuration for the TD CORESET comprises receiving an index that corresponds to the configuration for the TD CORESET from a list of pre-signaled TD CORESET configurations.

Aspect 32: The method of any of Aspects 22 through 31, wherein a first time associated with receiving the configuration for the TD CORESET and a second time associated with applying the configuration for the TD CORESET are separated by a gap that satisfies a threshold based at least in part on a UE capability.

Aspect 33: A method of wireless communication performed by a base station, comprising: transmitting, to a user equipment (UE), an indication of a configuration for a time domain (TD) control resource set (CORESET) for single carrier waveforms that dynamically changes one or more parameters associated with the TD CORESET; and transmitting, to the UE, a physical downlink control channel based at least in part on the indication of the configuration for the TD CORESET.

Aspect 34: The method of Aspect 33, wherein transmitting the indication of the configuration for the TD CORESET comprises transmitting the indication of the configuration in a demodulation reference signal associated with the TD CORESET.

Aspect 35: The method of any of Aspects 33 through 34, wherein transmitting the indication of the configuration for the TD CORESET comprises transmitting the indication of the configuration in downlink control information that occurs prior in time in relation to the TD CORESET.

Aspect 36: The method of any of Aspects 33 through 35, wherein transmitting the indication of the configuration for the TD CORESET comprises transmitting the indication of the configuration in a medium access control control element that occurs prior in time in relation to the TD CORESET.

Aspect 37: The method of any of Aspects 33 through 36, wherein transmitting the indication of the configuration for the TD CORESET comprises transmitting an index that corresponds to the configuration for the TD CORESET from a list of pre-signaled TD CORESET configurations.

Aspect 38: An apparatus for wireless communication at a device, comprising a processor; memory coupled with the processor; and instructions stored in the memory and executable by the processor to cause the apparatus to perform the method of one or more of Aspects 1-16.

Aspect 39: A device for wireless communication, comprising a memory and one or more processors coupled to the memory, the memory and the one or more processors configured to perform the method of one or more Aspects of Aspects 1-16.

Aspect 40: An apparatus for wireless communication, comprising at least one means for performing the method of one or more of Aspects 1-16.

Aspect 41: A non-transitory computer-readable medium storing code for wireless communication, the code comprising instructions executable by a processor to perform the method of one or more of Aspects 1-16.

Aspect 42: A non-transitory computer-readable medium storing a set of instructions for wireless communication, the set of instructions comprising one or more instructions that, when executed by one or more processors of a device, cause the device to perform the method of one or more of Aspects 1-16.

Aspect 43: An apparatus for wireless communication at a device, comprising a processor; memory coupled with the processor; and instructions stored in the memory and executable by the processor to cause the apparatus to perform the method of one or more of Aspects 17-21.

Aspect 44: A device for wireless communication, comprising a memory and one or more processors coupled to the memory, the memory and the one or more processors configured to perform the method of one or more Aspects of Aspects 17-21.

Aspect 45: An apparatus for wireless communication, comprising at least one means for performing the method of one or more of Aspects 17-21.

Aspect 46: A non-transitory computer-readable medium storing code for wireless communication, the code comprising instructions executable by a processor to perform the method of one or more of Aspects 17-21.

Aspect 47: A non-transitory computer-readable medium storing a set of instructions for wireless communication, the set of instructions comprising one or more instructions that, when executed by one or more processors of a device, cause the device to perform the method of one or more of Aspects 17-21.

Aspect 48: An apparatus for wireless communication at a device, comprising a processor; memory coupled with the processor; and instructions stored in the memory and executable by the processor to cause the apparatus to perform the method of one or more of Aspects 22-32.

Aspect 49: A device for wireless communication, comprising a memory and one or more processors coupled to the memory, the memory and the one or more processors configured to perform the method of one or more Aspects of Aspects 22-32.

Aspect 50: An apparatus for wireless communication, comprising at least one means for performing the method of one or more of Aspects 22-32.

Aspect 51: A non-transitory computer-readable medium storing code for wireless communication, the code comprising instructions executable by a processor to perform the method of one or more of Aspects 22-32.

Aspect 52: A non-transitory computer-readable medium storing a set of instructions for wireless communication, the set of instructions comprising one or more instructions that, when executed by one or more processors of a device, cause the device to perform the method of one or more of Aspects 22-32.

Aspect 53: An apparatus for wireless communication at a device, comprising a processor; memory coupled with the processor; and instructions stored in the memory and executable by the processor to cause the apparatus to perform the method of one or more of Aspects 33-37.

Aspect 54: A device for wireless communication, comprising a memory and one or more processors coupled to the memory, the memory and the one or more processors configured to perform the method of one or more Aspects of Aspects 33-37.

Aspect 55: An apparatus for wireless communication, comprising at least one means for performing the method of one or more of Aspects 33-37.

Aspect 56: A non-transitory computer-readable medium storing code for wireless communication, the code comprising instructions executable by a processor to perform the method of one or more of Aspects 33-37.

Aspect 57: A non-transitory computer-readable medium storing a set of instructions for wireless communication, the set of instructions comprising one or more instructions that, when executed by one or more processors of a device, cause the device to perform the method of one or more of Aspects 33-37.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    receiving, from a base station, a demodulation reference signal comprising an indication of a configuration for a time domain (TD) control resource set (CORESET) for single carrier waveforms, wherein the configuration dynamically changes an aggregation level associated with the TD CORESET and dynamically changes a quantity of available TD control channel elements (CCEs) for the TD CORESET or a quantity of available TD CCE bundles for the TD CORESET; and
    receiving, from the base station, a physical downlink control channel based at least in part on the indication of the configuration for the TD CORESET.

2. The method of claim 1, wherein the indication of the configuration for the TD CORESET indicates the aggregation level to be associated with the TD CORESET.

3. The method of claim 1, wherein the indication of the configuration for the TD CORESET indicates an aggregation configuration to be associated with the TD CORESET.

4. The method of claim 1, wherein the indication of the configuration for the TD CORESET indicates a beam diversity configuration to be associated with the TD CORESET.

5. The method of claim 1, wherein the indication of the configuration for the TD CORESET indicates a configuration of demodulation reference signals (DMRSs) for TD CCEs in the TD CORESET, wherein the TD CCEs may be self-contained CCEs with dedicated DMRSs or TD CCEs having a shared DMRS.

6. The method of claim 1, wherein receiving the indication of the configuration for the TD CORESET comprises receiving an index that corresponds to the configuration for the TD CORESET from a list of pre-signaled TD CORESET configurations.

7. The method of claim 1, wherein a first time associated with receiving the configuration for the TD CORESET and a second time associated with applying the configuration for the TD CORESET is separated by a gap that satisfies a threshold based at least in part on a UE capability.

8. A method of wireless communication performed by a base station, comprising:
    transmitting, to a user equipment (UE), a demodulation reference signal comprising an indication of a configuration for a time domain (TD) control resource set (CORESET) for single carrier waveforms, wherein the configuration dynamically changes an aggregation level associated with the TD CORESET and dynamically changes a quantity of available TD control channel elements (CCEs) for the TD CORESET or a quantity of available TD CCE bundles for the TD CORESET; and
    transmitting, to the UE, a physical downlink control channel based at least in part on the indication of the configuration for the TD CORESET.

9. The method of claim 8, wherein transmitting the indication of the configuration for the TD CORESET comprises transmitting an index that corresponds to the configuration for the TD CORESET from a list of pre-signaled TD CORESET configurations.

10. A user equipment (UE) for wireless communication, comprising:
    one or more memories; and
    one or more processors, coupled to the one or more memories, configured to:
        receive, from a base station, a demodulation reference signal comprising an indication of a configuration for a time domain (TD) control resource set (CORESET) for single carrier waveforms, wherein the configuration dynamically changes an aggregation level associated with the TD CORESET and dynamically changes a quantity of available TD control channel elements (CCEs) for the TD CORESET or a quantity of available TD CCE bundles for the TD CORESET; and
        receive, from the base station, a physical downlink control channel based at least in part on the indication of the configuration for the TD CORESET.

11. The UE of claim 10, wherein the indication of the configuration for the TD CORESET indicates the aggregation level to be associated with the TD CORESET.

12. The UE of claim 10, wherein the indication of the configuration for the TD CORESET indicates an aggregation configuration to be associated with the TD CORESET.

13. The UE of claim 10, wherein the indication of the configuration for the TD CORESET indicates a beam diversity configuration to be associated with the TD CORESET.

14. The UE of claim 10, wherein the indication of the configuration for the TD CORESET indicates a configuration of demodulation reference signals (DMRSs) for TD CCEs in the TD CORESET, wherein the TD CCEs may be self-contained CCEs with dedicated DMRSs or TD CCEs having a shared DMRS.

15. The UE of claim 10, wherein the one or more processors, to receive the indication of the configuration for the TD CORESET, are configured to receive an index that corresponds to the configuration for the TD CORESET from a list of pre-signaled TD CORESET configurations.

16. A base station for wireless communication, comprising:
one or more memories; and
one or more processors, coupled to the one or more memories, configured to:
transmit, to a user equipment (UE), a demodulation reference signal comprising an indication of a configuration for a time domain (TD) control resource set (CORESET) for single carrier waveforms, wherein the configuration dynamically changes an aggregation level associated with the TD CORESET and dynamically changes a quantity of available TD control channel elements (CCEs) for the TD CORESET or a quantity of available TD CCE bundles for the TD CORESET; and
transmit, to the UE, a physical downlink control channel based at least in part on the indication of the configuration for the TD CORESET.

17. The method of claim 1, wherein the configuration of the TD CORESET is based at least in part on a quantity of UEs that are multiplexed in the TD CORESET.

18. The UE of claim 10, wherein the configuration of the TD CORESET is based at least in part on a quantity of UEs that are multiplexed in the TD CORESET.

19. The method of claim 1, wherein the configuration dynamically changes a quantity of available TD CCEs, wherein the demodulation reference signal is multiplexed in time with the TD CCEs.

20. The method of claim 1, wherein the configuration dynamically changes a quantity of available TD CCE bundles, wherein the demodulation reference signal is multiplexed in time with the TD CCE bundles.

21. The method of claim 1, wherein there is a time gap between the demodulation reference signal and an application of the configuration for the TD CORESET, wherein the gap is based at least in part on one or more of a capability of the UE or a preconfigured rule.

22. The method of claim 8, wherein the configuration dynamically changes a quantity of available TD CCEs, wherein the demodulation reference signal is multiplexed in time with the TD CCEs.

23. The method of claim 8, wherein the configuration dynamically changes a quantity of available TD CCE bundles, wherein the demodulation reference signal is multiplexed in time with the TD CCE bundles.

24. The method of claim 8, wherein there is a time gap between the demodulation reference signal and an application of the configuration for the TD CORESET, wherein the gap is based at least in part on one or more of a capability of the UE or a preconfigured rule.

25. The UE of claim 10, wherein the configuration dynamically changes a quantity of available TD CCEs, wherein the demodulation reference signal is multiplexed in time with the TD CCEs.

26. The UE of claim 10, wherein the configuration dynamically changes a quantity of available TD CCE bundles, wherein the demodulation reference signal is multiplexed in time with the TD CCE bundles.

27. The UE of claim 10, wherein there is a time gap between the demodulation reference signal and an application of the configuration for the TD CORESET, wherein the gap is based at least in part on one or more of a capability of the UE or a preconfigured rule.

28. The base station of claim 16, wherein the configuration dynamically changes a quantity of available TD CCEs, wherein the demodulation reference signal is multiplexed in time with the TD CCEs.

29. The base station of claim 16, wherein the configuration dynamically changes a quantity of available TD CCE bundles, wherein the demodulation reference signal is multiplexed in time with the TD CCE bundles.

30. The base station of claim 16, wherein there is a time gap between the demodulation reference signal and an application of the configuration for the TD CORESET, wherein the gap is based at least in part on one or more of a capability of the UE or a preconfigured rule.

\* \* \* \* \*